United States Patent
Mizoguchi et al.

(10) Patent No.: US 7,720,293 B2
(45) Date of Patent: May 18, 2010

(54) IMAGE PROCESSING APPARATUS, PRINTING APPARATUS AND IMAGE PROCESSING METHOD

(75) Inventors: Masahiko Mizoguchi, Nagano (JP); Masatoshi Matsuhira, Nagano (JP); Shoji Kojima, Nagano (JP); Mitsuo Sakurai, Nagano (JP); Makoto Oyanagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 11/379,491

(22) Filed: Apr. 20, 2006

(65) Prior Publication Data
US 2007/0019870 A1   Jan. 25, 2007

(30) Foreign Application Priority Data

Apr. 20, 2005  (JP) .............................. 2005-122000
Mar. 8, 2006   (JP) .............................. 2006-062157

(51) Int. Cl.
*G06K 9/36* (2006.01)
(52) U.S. Cl. ..................................................... 382/232
(58) Field of Classification Search ......... 382/232–233, 382/236, 238–253; 348/393.1–416.1, 420.1–421.1; 375/240.02–240.25; 358/426.13–426.16
See application file for complete search history.

(56) References Cited

U.S. PATENT DOCUMENTS 6,289,138 B1 * 9/2001 Yip et al. .................... 382/307
6,754,279 B2 * 6/2004 Zhou et al. ............. 375/240.28

FOREIGN PATENT DOCUMENTS

JP   2001-86318   3/2001

* cited by examiner

*Primary Examiner*—Jose L Couso
(74) *Attorney, Agent, or Firm*—Sughrue Mion, PLLC

(57) ABSTRACT

An image processing apparatus including: a generating section, operable to analyze compressed image data stored in an external memory and generate an analytic table indicative of a storage manner of the compressed image data; an internal memory, adapted to store the compressed image data therein; a storage section, operable to acquire at least a part of the compressed image data from the external memory and store the compressed image data in the internal memory with reference to the analytic table; a decoding section, operable to read and decode the compressed image data stored in the storage section, and rotate and then output the compressed image data as a rotated image data; and an updater, operable to update the analytic table in accordance with a decoding situation of the decoding section.

20 Claims, 21 Drawing Sheets

FIG. 9

| No. | Y (2 BYTES) | Cb (2 BYTES) | Cr (2 BYTES) | ADDRESS (4 BYTES) | BIT | S ADDRESS (4 BYTES) | RESIDUAL AMOUNT W (2 BYTES) |
|---|---|---|---|---|---|---|---|
| 1 | 00 | 00 | 00 | 0x00000 | 0b000 | 0xA0000 | 0x2000 |
| 2 | 00 | 00 | 00 | 0x023F0 | 0b101 | 0xA2000 | 0x2000 |
| 3 | 00 | 00 | 00 | 0x03120 | 0b111 | 0xA4000 | 0x2000 |
| ... | ... | ... | ... | ... | ... | ... | ... |
| n | 00 | 00 | 00 | 0x052B0 | 0b110 | 0xA9400 | 0x2000 |

FIG. 14

| No. | Y (2 BYTES) | Cb (2 BYTES) | Cr (2 BYTES) | ADDRESS (4 BYTES) | BIT | S ADDRESS (4 BYTES) | RESIDUAL AMOUNT W (2 BYTES) |
|---|---|---|---|---|---|---|---|
| 1 | 56 | 10 | 124 | 0x00030 | 0b100 | 0xA0030 | 0x1FD0 |
| 2 | 12 | 24 | 314 | 0x02441 | 0b001 | 0xA2051 | 0x1FAF |
| 3 | 254 | 124 | 21 | 0x0315F | 0b101 | 0xA403F | 0x1FC1 |
| ... | ... | ... | ... | ... | ... | ... | ... |
| n | 321 | 354 | 50 | 0x052F0 | 0b110 | 0xA9440 | 0x1FC0 |

FIG. 18
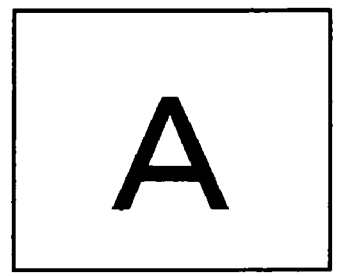 FIRST IMAGE
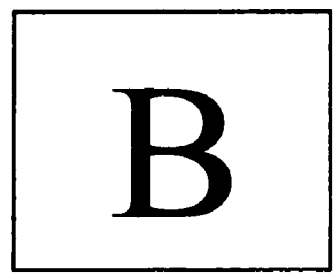 SECOND IMAGE
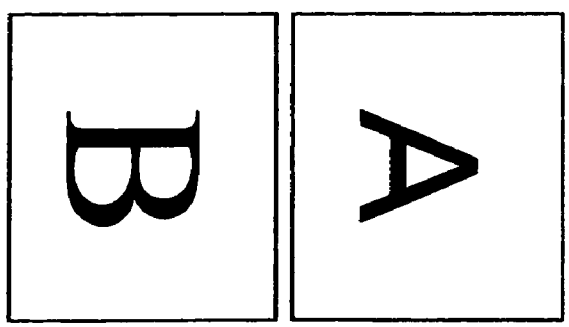

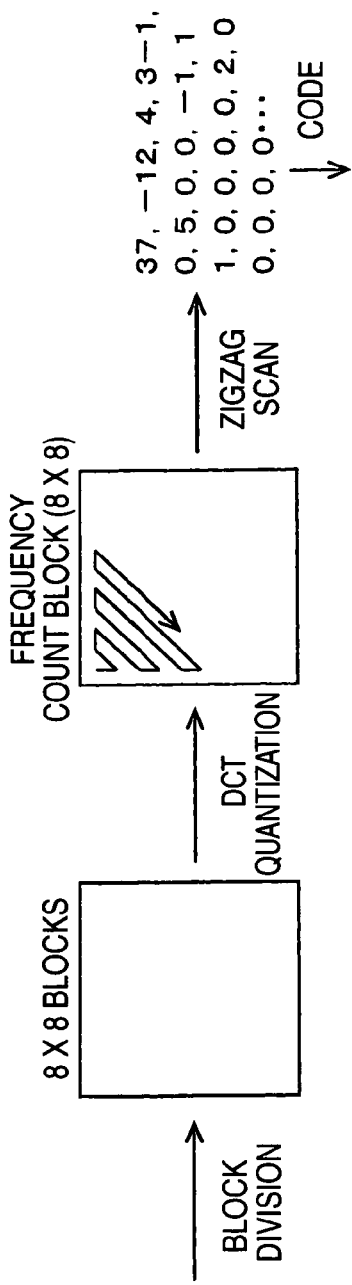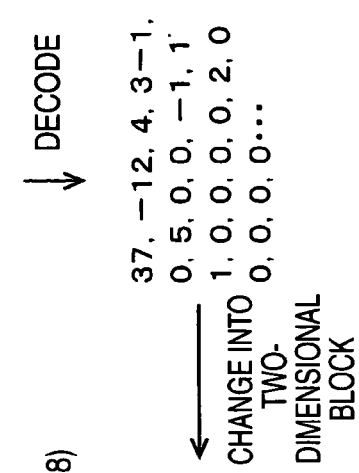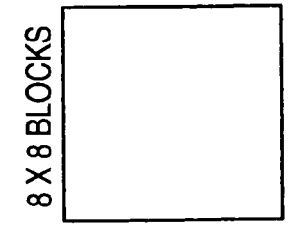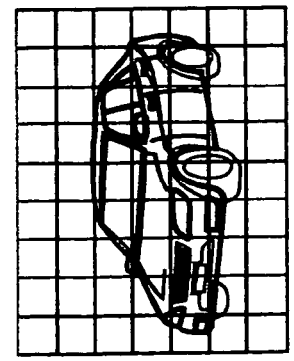

IMAGE PROCESSING APPARATUS, PRINTING APPARATUS AND IMAGE PROCESSING METHOD

BACKGROUND OF THE INVENTION

1. Technical Field of the Invention

The present invention relates to an image processing apparatus, a printing apparatus and an image processing method.

2. Description of the Related Art

In recent years, an image compression technique has spread with the development of a network and a digital apparatus. The most popular example of a format of the image compression includes "JPEG (Joint Photograph Experts Group)". The JPEG is a high efficiency coding standard which can compress static image information expressed in 24 bits of RGB (red, green and blue).

FIG. 21 is a conceptual diagram showing a typical example of compression and decode processing based on the JPEG. More specifically, FIGS. 21(A) to 21(D) illustrate a compressing (coding) process and FIGS. 21(E) to 21(H) illustrate a reconstituting (decoding) process.

In the JPEG compression, original images expressed in RGB, or Y (brightness) Cb (blue color difference) Cr (red color difference) are first divided into blocks of 8 pixels×8 pixels as shown in FIG. 21(A).

As shown in FIG. 21(B), next, a DCT (discrete cosine transform) processing is carried out for each block. The DCT processing corresponds to a spatial frequency transformation, and a block image is expressed in a frequency by this processing. If image data are generally expressed in a frequency spectrum, information concentrates in a low frequency band. By omitting a high frequency band, therefore, it is possible to carry out coding in a small amount of information. Thus, the information is further quantized after the conversion to the frequency and is thus made discrete.

Next, data thus DCT quantized are subjected to a zigzag scan and are arranged in a line (are changed into serial data) as shown in FIG. 21(C). By carrying out an entropy code processing, then, it is possible to obtain a coding row shown in FIG. 21(D).

On the other hand, a reconstitution is executed as shown in FIGS. 21(E) to 21(H) by reversely carrying out a serial processing.

In some cases in which image data are treated, an input image is to be simply rotated at a predetermined angle. For example, when a JPEG image fetched into a personal computer through a medium such as a CD-ROM or internet is to be printed and output by means of a printer, the JPEG image is to be output in a rotating state at 90 degrees, 180 degrees or 270 degrees corresponding to a size of a paper or a layout of an image in some cases.

In such cases, it is possible to propose a method of reconstituting a whole JPEG image to be a target and then carrying out a rotation processing at a predetermined angle.

According to this method, however, there is a problem in that a memory having a large capacity for temporarily holding the whole reconstituted image is required, and furthermore, a time required for carrying out the rotation processing over image data having a large capacity is also increased, resulting in an increase in a load for a system.

For example, if it is assumed that the processing of reconstituting, holding and rotating the JPEG image is executed by a host computer, a memory cost of the host is increased, and furthermore, a processing load is increased. On the other hand, it is necessary to additionally provide a memory having a large capacity in order to execute the same operation on the printer side. Consequently, the cost is increased considerably.

In order to solve the problems, therefore, the technique disclosed in JP-A-2001-086318 has been proposed, for example.

A rotation processing described in JP-A-2001-086318 has been implemented in software. If the processing is to be carried out in software, thus, there is a problem in that a processing speed can be simply enhanced to some extent.

SUMMARY OF THE INVENTION

The invention has been made based in view of these circumstances and has, as an object, providing an image processing apparatus, a printing apparatus and an image processing method which can reconstitute compressed image data in a small memory at a high speed and can sequentially output them.

In order to attain this object, an image processing apparatus of an embodiment of the invention includes: a generating section, operable to analyze compressed image data stored in an external memory and generate an analytic table indicative of a storage manner of the compressed image data; an internal memory, adapted to store the compressed image data therein; a storage section, operable to acquire at least a part of the compressed image data from the external memory and store the compressed image data in the internal memory with reference to the analytic table; a decoding section, operable to read and decode the compressed image data stored in the storage section, and rotate and then output the compressed image data as a rotated image data; and an updater, operable to update the analytic table in accordance with a decoding situation of the decoding section.

According to the foregoing embodiment, therefore, it is possible to provide an image processing apparatus capable of reconstituting and sequentially outputting compressed image data using a small amount of memory, and at a high speed.

In a further embodiment, the analytic table may include address information indicative of an address including an MCU (Minimum Coded Unit) in a file containing the compressed image data, and bit information indicative of a start position of the MCU in the address. Therefore, it is possible to rapidly acquire a desirable MCU.

In a particular embodiment, the internal memory may be provided with a plurality of storage regions for storing the compressed image data on a unit of a column, and the decoding section decodes the compressed image data stored in the storage regions on a unit of the MCU. By reading the compressed image data stored in the internal memory based on a predetermined rule, therefore, it is possible to rapidly rotate coding image data.

Also, the image processing apparatus may further include a printing section adapted to store a predetermined amount of the decoding image data decoded by the decoding section and then print the decoding image on a recording medium. Therefore, it is possible to rapidly print, on the recording medium, an image subjected to a decode processing and a rotation processing.

Moreover, the image processing apparatus may include a selecting section, operable to select either a first connecting manner in which the external memory is directly connected to an interface provided in the apparatus or a second connecting manner in which the external memory is connected to the apparatus through a connecting cable while connecting to an external apparatus. Therefore, it is possible to reliably read and decode the compressed image data irrespective of a connecting manner of the external memory.

In another embodiment, the image processing apparatus may have a confirming section, operable to confirm that, when the external memory is connected to the apparatus through a connecting cable while connecting to an external apparatus, the external memory can be accessed. Also in the case in which the external memory is connected through the connecting cable, therefore, it is possible to reliably decode and output the compressed image data.

Moreover, an image processing apparatus of another embodiment includes an internal memory circuit, adapted to store at least a part of compressed image data stored in an external memory therein; an image processing hardware circuit, operable to read and decode the compressed image data stored in the internal memory circuit and give a notice to a central processing circuit when a residual amount of the compressed image data in the internal memory circuit is reduced; and the central processing circuit, operable to acquire the at least a part of the compressed image data from the external memory and store the compressed image data in the internal memory circuit when the notice is given from the image processing circuit.

According to the embodiment, therefore, it is possible to provide an image processing apparatus capable of reconstituting compressed image data in a small memory at a high speed and sequentially outputting them.

Moreover, an image processing apparatus of yet another embodiment includes an internal storage circuit, adapted to store at least a part of compressed image data stored in an external memory therein; an image processing hardware circuit, operable to: analyze the compressed image data and generate an analytic table indicative of a storage manner of the compressed image data; read and decode the compressed image data stored in the internal storage circuit; rotate and output the decoding image data as a rotated image data; update the analytic table in accordance with a decoding situation; and give a notice to a central processing circuit when a residual amount of the compressed image data stored in the internal storage circuit is reduced; and the central processing circuit, operable to acquire and store the at least a part of the compressed image data in the internal storage circuit when the notice is given from the image processing hardware circuit.

According to this embodiment, therefore, it is possible to provide an image processing apparatus capable of reconstituting compressed image data in a small memory at a high speed and sequentially outputting them.

In addition, the image processing apparatus may further have a selecting section, operable to select either a first connecting manner in which the external memory is directly connected to an interface provided in the apparatus or a second connecting manner in which the external memory is connected to the apparatus through a connecting cable while connecting to an external apparatus. Therefore, it is possible to reliably read and decode the compressed image data irrespective of the connecting manner of the external memory.

In another particular embodiment, the image processing apparatus may have a confirming section, operable to confirm that, when the external memory is connected to the apparatus through a connecting cable while connecting to an external apparatus, the external memory can be accessed. Also in the case in which the external memory is connected through the connecting cable, therefore, it is possible to reliably decode and output the compressed image data.

BRIEF DESCRIPTION OF THE DRAWINGS

FIG. 9 is a diagram showing an example of an analytic table to be used in the first embodiment, FIG. 14 is a diagram showing an analytic table obtained after the completion of the processing for the first processing block, FIG. 18 is a diagram for explaining the summary of an operation according to a second embodiment, FIG. 21 is a diagram showing JPEG coding and decoding.

DETAILED DESCRIPTION OF THE INVENTION

An embodiment of the invention will be described below with reference to the drawings.

First Embodiment

Figure 1:
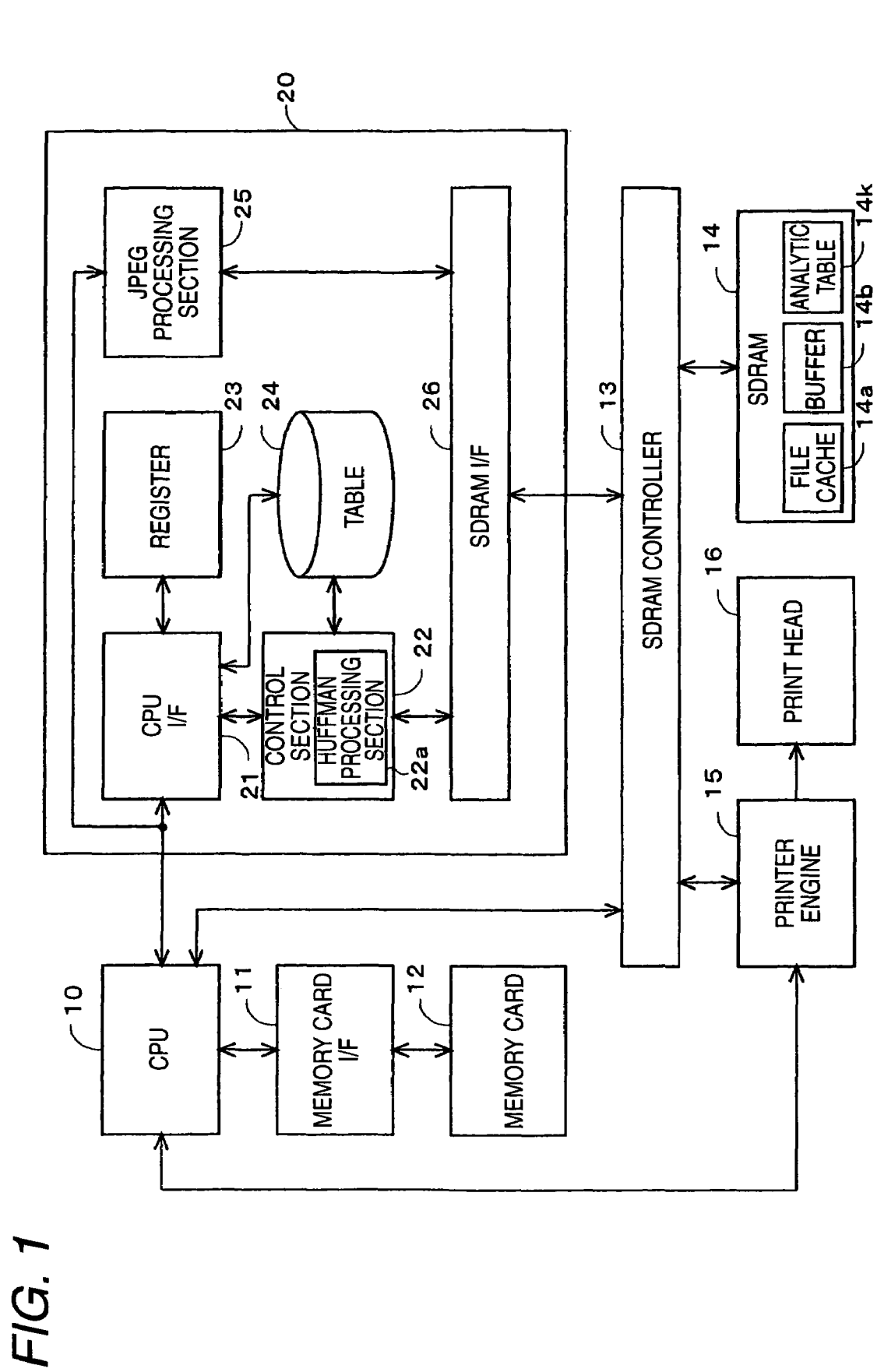
FIG. 1 is a diagram showing an example of a structure of an image processing apparatus according to a first embodiment.

FIG. 1 is a diagram showing an example of a structure of an image processing apparatus according to a first embodiment of the invention. As shown in FIG. 1, the image processing apparatus according to the first embodiment of the invention comprises, as main components, a CPU (Central Processing Unit) 10, a memory card I/F (Interface) 11, a memory card 12, an image processing circuit 20, an SDRAM (Synchronous Dynamic Random Access Memory) controller 13, an SDRAM 14, a printer engine 15, and a print head 16.

The CPU 10, which may be thought of as a central processing circuit, is a control device for controlling each portion of the apparatus. The memory card I/F 11 is an interface for carrying out a control when reading information stored in the memory card 12 and writing new information in the case which the memory card 12 is attached. The memory card 12, which may be thought of as an external storage section (for example, nonvolatile memory) is constituted, e.g., by a flash memory x and is removably attached to a digital camera (which is not shown) so that photographed image data are stored, and, furthermore, is connected to the memory card I/F 11 so that the stored image data can be read. It is also possible to connect a DSC (Digital Still Camera) through a direct connection such as, e.g., a USB (Universal Serial Bus) and to directly read image information stored in the DSC.

The image processing circuit 20 may be thought of as having a generating section, a decoding section and an update section, is constituted by a semiconductor device such as an IC (Integrated Circuit) and carries out a rotation processing (for example, 90 degrees, 180 degrees or 270 degrees) over image data read from the memory card 12 and stored in the SDRAM 14, and outputs the rotated image data thus obtained. The image processing circuit 20 is not necessarily constituted as a separate semiconductor device, to be a single unit, but may be constituted as part of a semiconductor device in a configuration such that there are included any or all of the CPU 10, the memory card I/F 11, the SDRAM controller 13 and the SDRAM 14.

The image processing circuit 20 includes, as main components, a CPU I/F 21, a control unit 22, a register 23, a table 24, a JPEG processing unit 25 and an SDRAM I/F 26.

The CPU I/F 21 is an interface for transferring information together with the CPU 10. The control unit 22 controls each portion of the image processing circuit 20 and decodes a Huffman code applied to JPEG image data stored in the SDRAM 14 or the memory card 12 through a built-in Huffman processing unit 22a.

The register 23 is an internal memory for holding information indicative of an operation mode, information indicative of a current status and information indicative of a storage position on the SDRAM 14 in an analytic table which will be described below. The table 24 is a memory for storing information necessary for Huffman decoding. The JPEG processing unit 25 is a circuit for executing a JPEG processing as will be described below with reference to FIG. 2 and is constituted as a part of the image processing circuit 20, for example.

The SDRAM I/F 26 is an interface for reading information stored in the SDRAM 14 and storing information in the SDRAM 14.

The SDRAM controller 13 is an interface for controlling the SDRAM 14. The SDRAM 14, which may be thought of as an internal storage section and/or an internal storage circuit is a memory for temporarily storing information necessary for executing a predetermined processing by the CPU 10 or the image processing circuit 20, for example.

Figure 2:
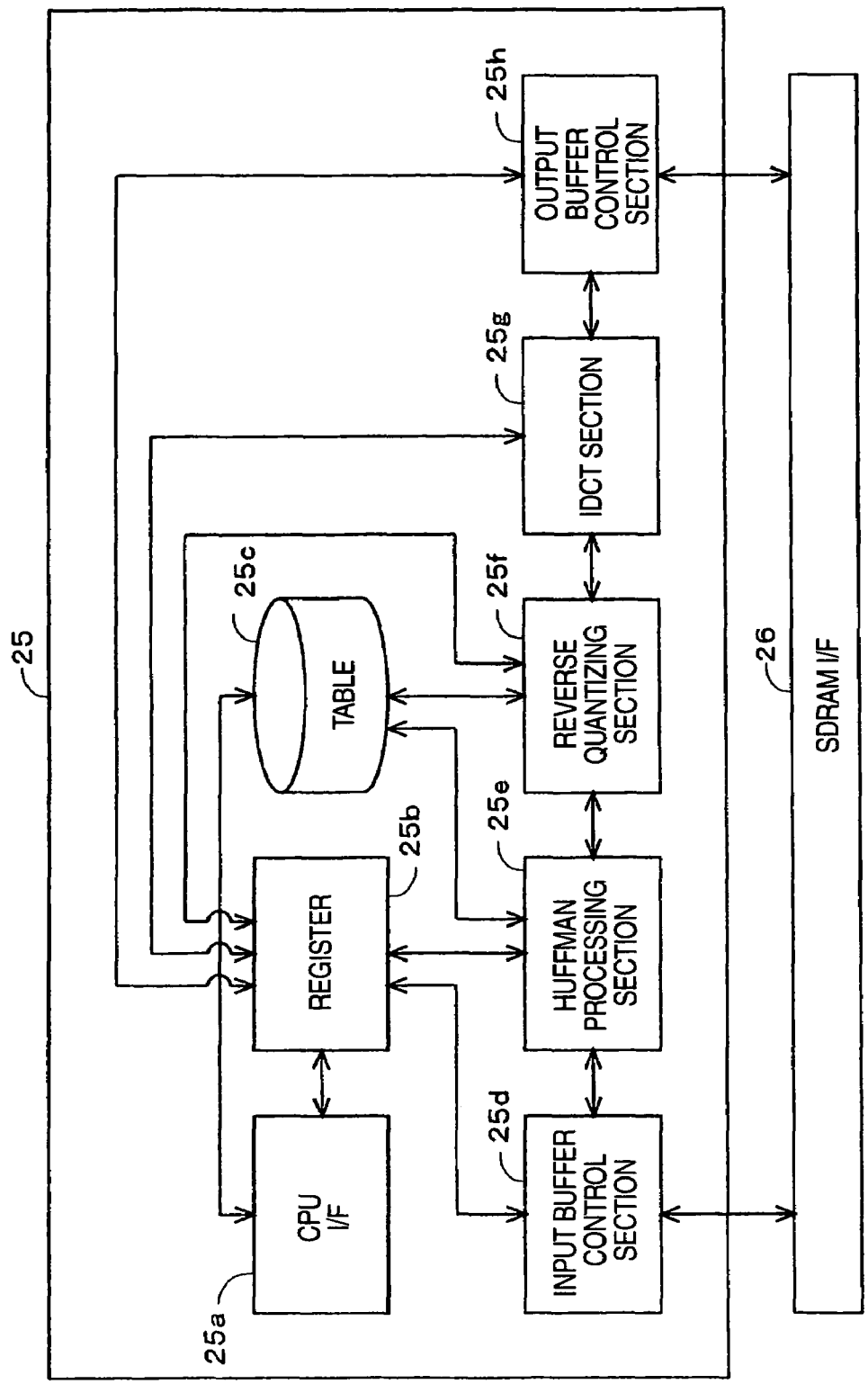
FIG. 2 is a diagram showing an example of a structure of a JPEG processing unit illustrated in FIG. 1.

FIG. 2 is a diagram showing an example of a detailed structure of the JPEG processing unit 25 illustrated in FIG. 1. As shown in FIG. 2, the JPEG processing unit 25 is constituted by a CPU I/F 25a, a register 25b, a table 25c, an input buffer control unit 25d, a Huffman processing unit 25e, a reverse quantizing unit 25f, an IDCT (Inverse Discrete Cosine Transform) unit 25g, and an output buffer control unit 25h.

The CPU I/F 25a is an interface for transferring information together with the CPU 10. The register 25b is an internal memory for holding information indicative of an operation mode and information indicative of a current status.

The table 25c has a Huffman table, a quantizing table, image information, and MCU (Minimum Coded Unit (minimum processing unit)) information which are required for decoding image data.

The input buffer control unit 25d controls an input buffer for reading information from the SDRAM 14. The Huffman processing unit 25e carries out a Huffman decode processing by referring to a Huffman table stored in the table 25c with respect to image data input through the input buffer control unit 25d. The reverse quantizing unit 25f carries out a reverse quantization processing by referring to a reverse quantizing table stored in the table 25c with respect to image data supplied from the Huffman processing unit 25e. The IDCT unit 25g carries out an IDCT processing over the image data supplied from the reverse quantizing unit 25f. The output buffer control unit 25h controls an output buffer for outputting image data.

Returning to FIG. 1, the SDRAM 14 includes a file cache 14a to be a cache for reading image data from the memory card 12, a buffer 14b for storing image data in predetermined order (which will be described below in detail), and an analytic table 14k having information for acquiring a desirable MCU from image data.

The printer engine 15 serves to execute a processing for printing an image decoded by the image processing circuit 20. The print head 16 is a head of an ink jet type, for example, and discharges ink to a recording medium such as a paper, and prints a desirable image.

Next, a description will be given of the summary of an operation according to the embodiment of the invention.

Figure 3:
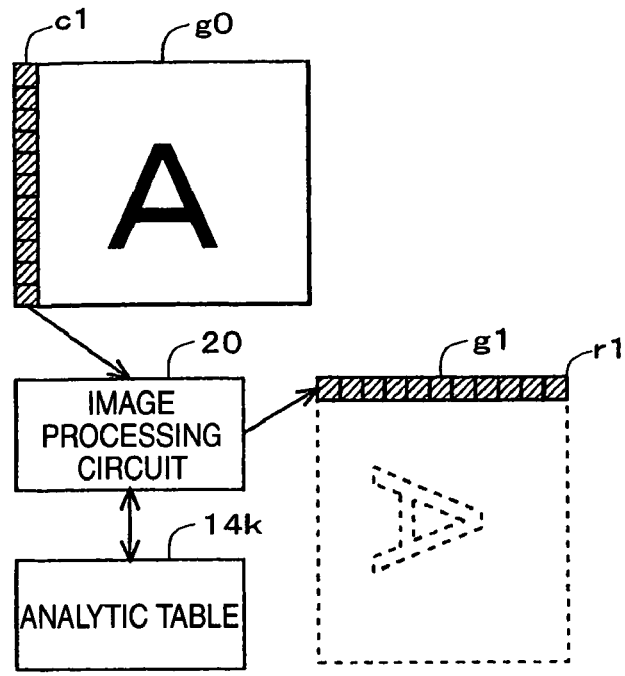
FIG. 3 is a diagram for explaining the summary of an operation according to the first embodiment.
Figure 3:
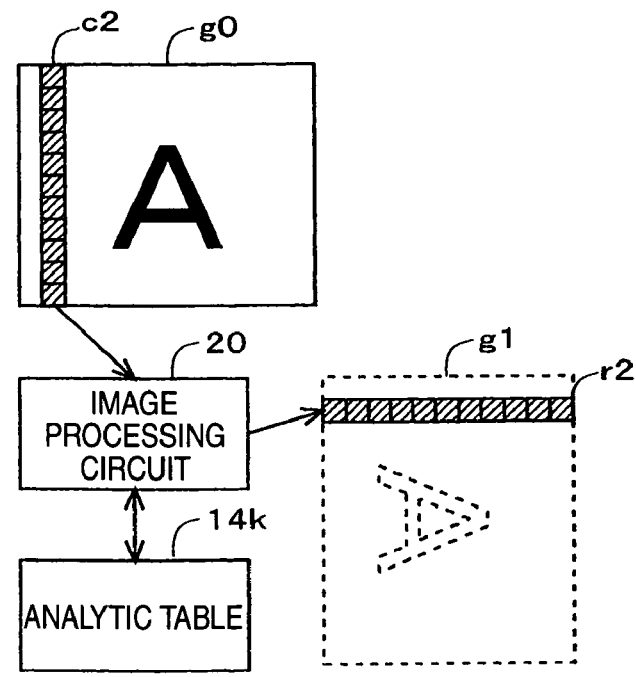

FIG. 3 is a diagram for explaining the summary of the operation according to the embodiment of the invention. In the embodiment according to the invention, compressed image data (which will be hereinafter referred to as "image data") compressed by a JPEG method are rotated in a predetermined direction (at 90 degrees in a clockwise direction, for example) and are thus output. In the case in which image data g0 shown in FIG. 3(A) are rotated at 90 degrees in the clockwise direction to generate image data g1, it is necessary to generate row data r1 (a portion shown in hatching) of image data obtained after the rotation processing from column data c1 (a portion shown in hatching) of the image data. In the case in which the rotation processing on a left end is ended, moreover, it is necessary to generate row data r2 (a portion shown in hatching) of the image data obtained after the rotation processing from column data c2 (a portion shown in hatching) which is rightward adjacent to the column data c1 on a left end and to subsequently carry out the same processing to succeeding column data as shown in FIG. 3(B).

Figure 4:
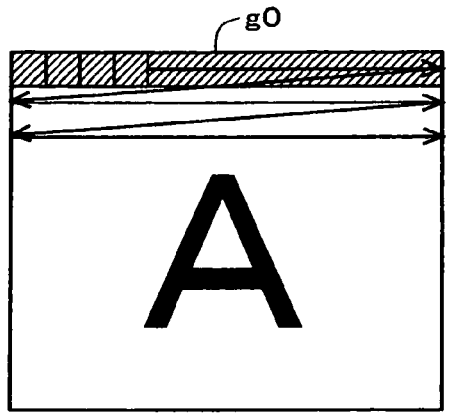
FIG. 4 is a diagram showing a relationship between image data and a processing block.
Figure 4:
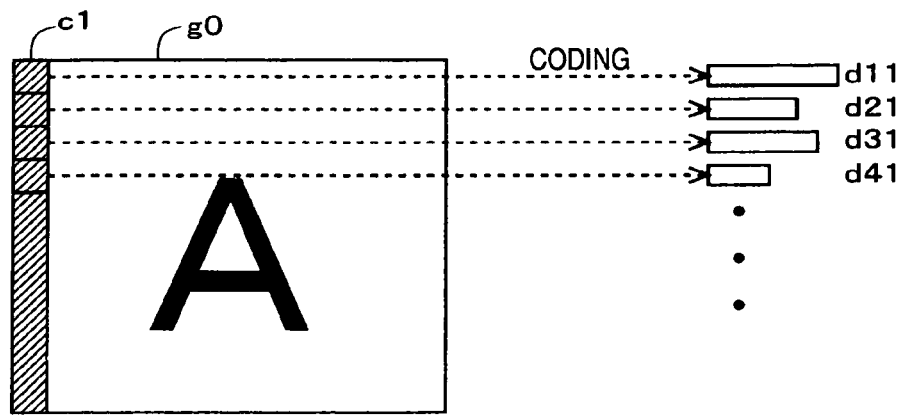
Figure 4:
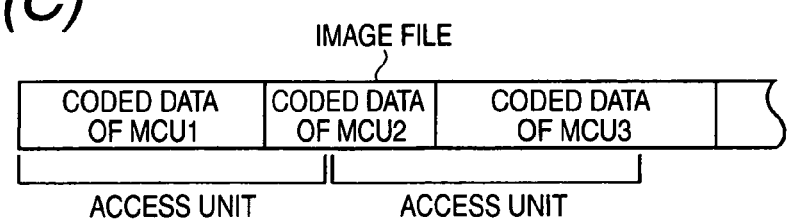

The image data subjected to the JPEG coding are coded in a rightward direction in order from the MCU (a minimum unit of a processing) positioned on a left and upper end of the image data g0, and a return to a left end on a second row is carried out to perform zigzag coding after the end of a first row so that a series of bit stream data (image file) are obtained as shown in FIG. 4(A). As shown in FIG. 4(B), when each MCU of the column data c1 of the image data g0 is coded, data d11 to d32 . . . to be the coded bit stream thus obtained have lengths varied respectively. In order to acquire a MCU (hereinafter referred to as a "starting block") included in the column data c1 on the left end from the bit stream as shown in FIG. 3(A), accordingly, it is necessary to previously know a position in the bit stream (image file) of the starting block.

As shown in FIG. 4(C), moreover, an access unit in the read of the image file from the memory card 12 is not always coincident with the data size of each MCU, and the data sizes of the MCUs are also different from each other. In some cases, therefore, each MCU extends over a plurality of access units. In order to read a desirable MCU from the image file, accordingly, it is necessary to know any of the access units which includes the MCU and to know any of them at which the MCU is started. In the embodiment, the former is previously acquired as address information and the latter is previously acquired as bit information, and they are stored in the analytic table 14k shown in FIG. 3 and the rotation processing of the image data is executed by referring to them.

In the image file of the JPEG type, referring to a quantizing DC component of a quantizing DCT coefficient, a differential value between the MCUs is Huffman coded (an adjacent DC component value is coded by DPCM (Differential Pulse Code Modulation). In order to acquire the quantizing DC component, therefore, it is necessary to accumulate the differential value of the quantizing DC component obtained by a Huffman decompression. In the embodiment, information for accumulating the quantizing DC component is held as a DC component of each of Y, Cb and Cr in the analytic table 14k and the DC component is calculated by referring to the information.

When the image processing circuit 20 rotates the image data, furthermore, the SDRAM 14, which may be understood to be a buffer for temporarily storing the image data, has a limited capacity and only a part of the image file can generally be stored. In the embodiment, a certain amount of image data (8 kilobytes in the embodiment) including the starting block are read from the memory card 12 and are stored in the buffer 14b of the SDRAM 14, and furthermore, a start position of the decode of the image data which are stored and a residual amount are stored in the analytic table 14k, and buffering is controlled based thereon.

More specifically, in this embodiment according to the invention, in the case in which the rotation processing for the image data is carried out, the whole image data are first processed by the image processing circuit 20 to acquire an address of an access unit including a starting block of the image data and a bit indicative of a start position of the starting block, thereby generating the analytic table 14k. Next, the image processing circuit 20 acquires data corresponding to the column c1 on the left end of the image data to decode an AC component by referring to an address and a bit which are stored in the analytic table 14k, and furthermore, decodes and outputs the value of the DC component. The output of the image processing circuit 20 is subjected to a permutation processing by a circuit present in a rear stage of the image processing circuit 20 (which will be described below with reference to FIG. 5) so that row data r1 subjected to the rotation are obtained. In this processing, the image processing circuit 20 updates the analytic table 14k based on a start address of the column data c2 in a second column and a value of the DC component which is obtained every time each MCU is processed. As a result, when the decode processing of the column data c1 in the first column is completed, the analytic table 14k for decoding the column data in the second column is finished.

When the decoding of the column data in the first column is ended, the image processing circuit 20 starts a processing of converting the column data c2 in the second column into the row data r2 with reference to the analytic table 14k. At this time, in the same manner as described above, the analytic table 14k for carrying out a processing of converting column data c3 in a third column into row data r3 is generated every processing for each row. Accordingly, the analytic table 14k for the third column is finished when the processing for the second column is completed.

At this time, the image data are read from the memory card 12 and are stored in the buffer 14b provided in the SDRAM 14, and are sequentially read to carry out a decode processing as will be described below in detail. The analytic table 14k manages an S address to be a reading position of the image data stored in the buffer 14b and a residual amount W of the buffer 14b. In the case in which the residual amount W is smaller than a predetermined lower limit value L, the update of the buffer 14b is executed and the image data are efficiently read so that the decode processing is executed.

By repeating the above processing, it is possible to convert the image data g0 into the image data g1 obtained by a rotation at 90 degrees in a clockwise direction.

Thus, the rotation processing is executed with reference to the analytic table 14k, and at the same time, the next analytic table 14k is generated. As compared with the case in which the processing is executed in software, therefore, the processing can be carried out at a higher speed. By setting the processing to be pipelining, for example, it is possible to further increase the speed of the processing. Furthermore, the image processing circuit 20 executes the processing of generating the analytic table 14k simultaneously with the decode processing. Therefore, a load of a CPU to manage the system can be relieved and a processing speed of the whole system can be enhanced.

Next, description will be given to a detailed operation according to the embodiment of the invention.

Figure 5:
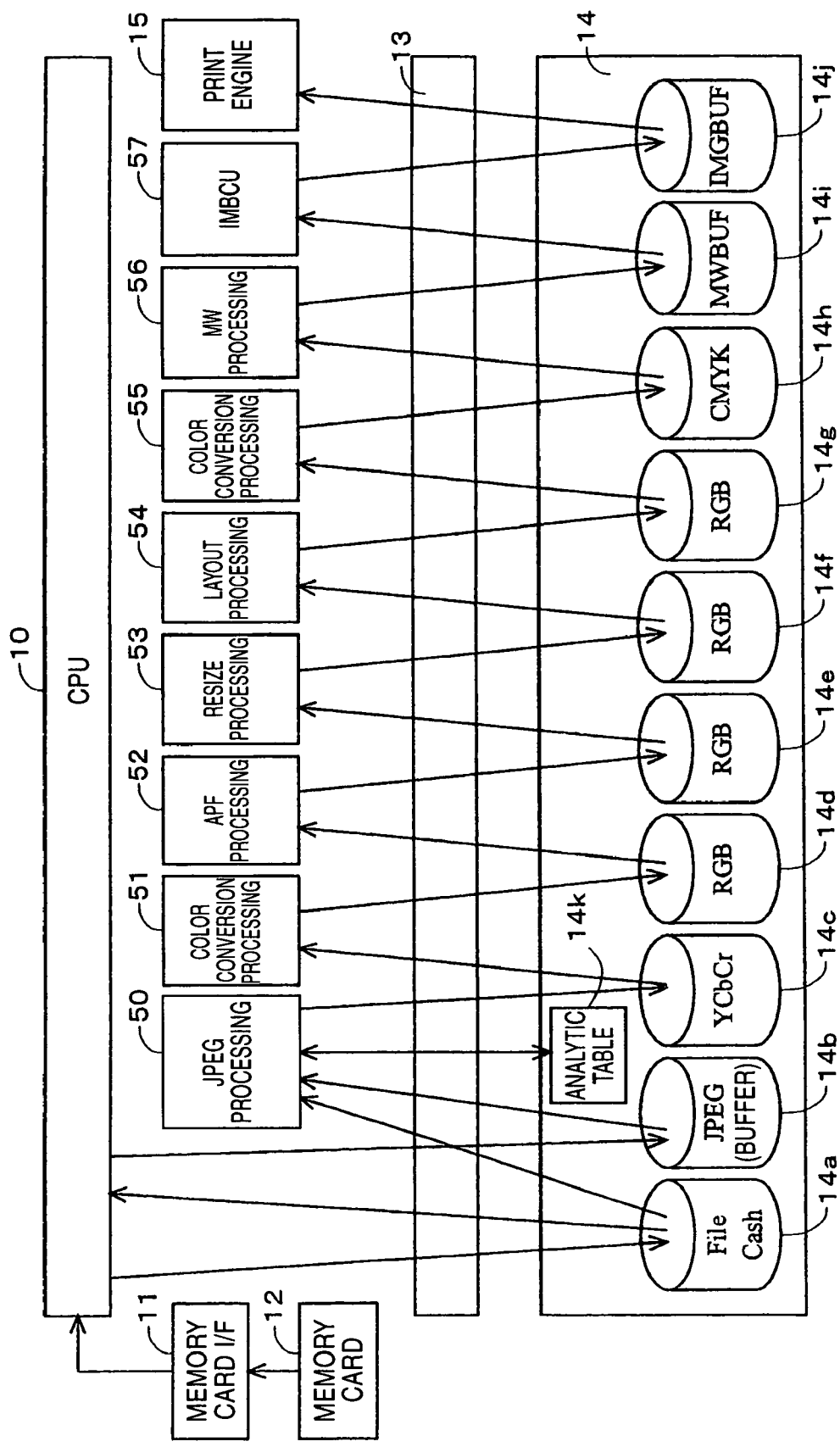
FIG. 5 is a diagram showing a flow of a processing to be executed in the first embodiment.

FIG. 5 is a diagram for explaining a flow of a whole processing in the image processing apparatus according to the first embodiment of the invention. In FIG. 5, a JPEG process 50 is a processing executed by the image processing circuit 20, and a color conversion processing 51, an APF (Auto Photo Fine) processing 52, a resize processing 53, a layout processing 54, a color conversion processing 55, an MW (Micro Weave) processing 56 and an IMBCU (Image Buffer Control Unit) 57 are implemented by executing a predetermined program through the CPU 10. These processes may be implemented in hardware if necessary.

When an image is to be rotated and printed, first of all, a processing of creating the analytic table 14k is executed. More specifically, the CPU 10 reads the image data from the memory card 12 through the memory card I/F 11 and stores the same image data as file cache 14a. The CPU 10 reads image data from the file cache 14a, and properly permutates the same data and stores them in the buffer 14b. The image processing circuit 20 properly reads the image data stored in the buffer 14b of the SDRAM 14 and carries out the JPEG decode processing, thereby specifying a starting block and extracting the DC component to create the analytic table 14k.

When the creation of the analytic table 14k is completed, the CPU 10 reads the image data on a predetermined unit (for example, a unit of 512 bytes) through the memory card I/F 11 from the memory card 12, and stores the same image data as the file cache 14a in the SDRAM 14 through the SDRAM controller 13. The CPU 10 reads the image data from the file cache 14a, and properly permutates the same image data and stores them in the buffer 14b. The image data thus stored in the SDRAM 14 are read by the image processing circuit 20 and are subjected to the JPEG processing 50, and are decoded into YCbCr data and are stored as a YCbCr 14c in the SDRAM 14. The details of the control of the buffer 14b in the SDRAM 14 will be described below.

The YCbCr 14c obtained by decoding is subjected to the color conversion processing 51, and is converted into the RGB data and is stored as an RGB 14d in the SDRAM 14. For the color conversion processing 51, for example, a γ (gamma) correction processing and a reverse γ correction processing are carried out over the YCbCr data, thereby correcting a relationship of a change in an amplitude of a video signal with a brightness. An APF processing 52 is carried out over the RGB data 14*d* subjected to the color conversion processing 51, and the RGB data 14*d* are stored as an RGB 14*e* in the SDRAM 14. The APF processing 52 includes a noise removal processing for removing a false color generated when a time required for an exposure is long, a tone curve correction processing to be executed for regulating a white balance and a tone of a color, a stored color correction processing for an adaptation to a color stored by a person, a color saturation correction processing for regulating a brightness of an image, and a sharpness processing for enhancing a contour, for example.

The RGB 14*e* to be the image data subjected to the APF processing 52 is subjected to the resize processing 53 for resizing image data corresponding to a print paper size and is stored as an RGB 14*f* in the SDRAM 14. The RGB 14*f* subjected to the resize processing 53 is subjected to a layout processing 54 for determining a layout for a print paper (for example, a processing of setting a print position on the print paper or a processing of superposing images on a plurality of sheets) and is stored as an RGB 14*g* in the SDRAM 14. The RGB 14*g* subjected to the layout processing 54 is subjected to the color conversion processing 55 for converting an RGB surface color system into a CMYK surface color system to be a surface color system of the printer and is stored as a CMYK 14*h* in the SDRAM 14. The CMYK 14*h* subjected to the color conversion processing 55 is subjected to an MW processing 56 for carrying out a microweave print and is stored in an MWBUF (Micro Weave Buffer) 14*i*. The CMYK data stored in the MWBUF 14*i* are read through an IMBCU 57, and are subjected to a halftone processing and are stored in an IMG-BUF 14*j*. The data stored by the IMGBUF 14*j* are sequentially read by the printer engine 15 and are converted into a signal for a print head of the printer, and the signal is then supplied to the print head 16 so that an image is printed on a print paper.

Next, description will be given to the details of the JPEG processing 50 shown in FIG. 5 (a processing of generating the analytic table 14*k* and carrying out JPEG decoding over image data based on the analytic table 14*k*).

Figure 6:
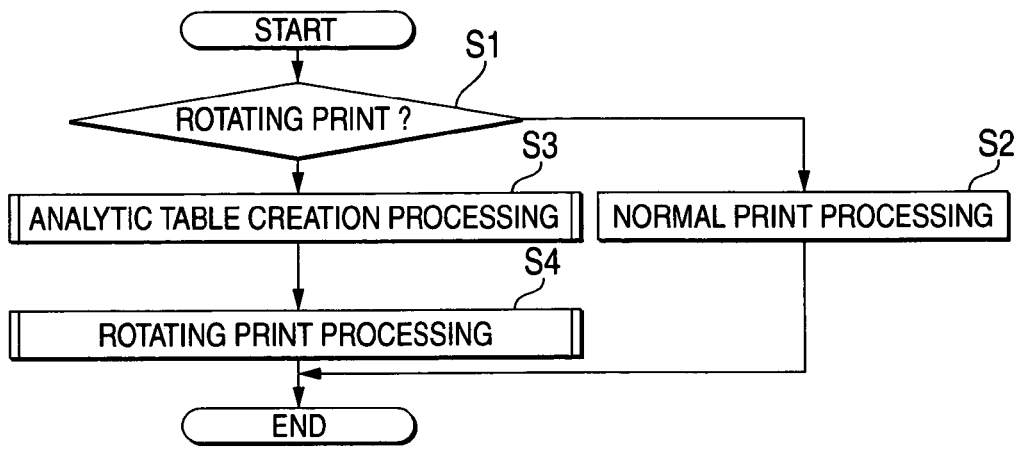
FIG. 6 is a flowchart showing the flow of the processing to be executed in the first embodiment.
Figure 6:
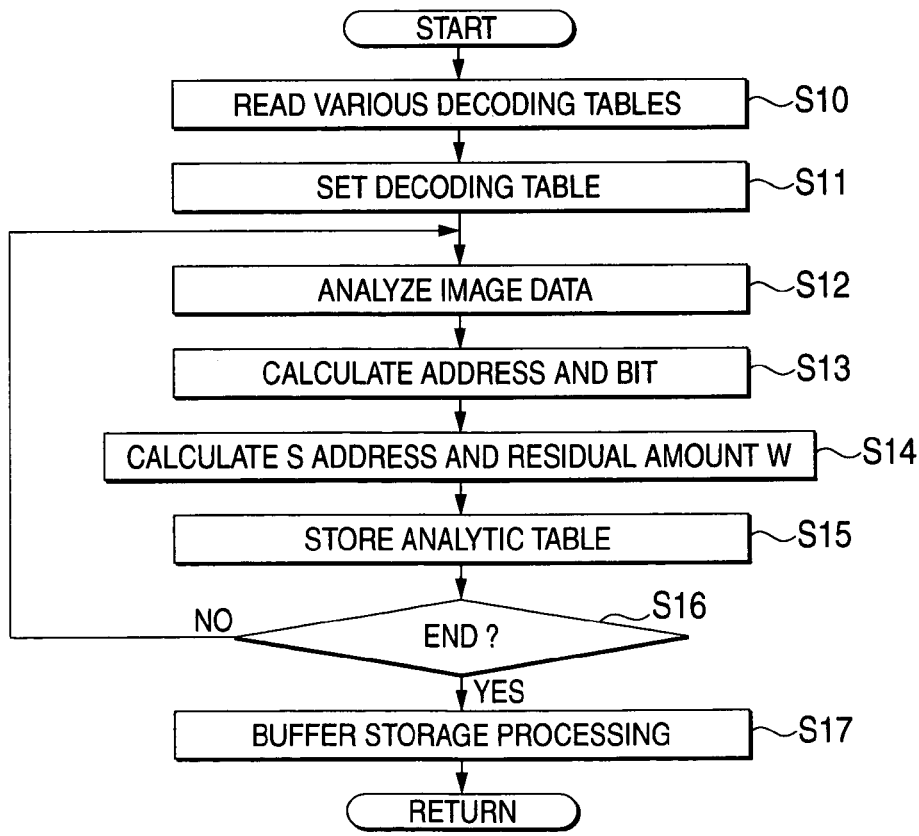

FIG. 6(A) is a flowchart for explaining a processing to be executed in the case in which predetermined image data stored in the memory card 12 are specified and an instruction for printing is given. When the processing of the flowchart is started, the following steps are executed.

Step S1: It is decided whether the CPU 10 is to rotate and print an image or not. As a result, if it is decided that the image does not need to be rotated and printed, the processing proceeds to Step S2. In the other cases, the processing proceeds to Step S3.

Step S2: The CPU 10 executes a "normal print processing" of normally printing an image. More specifically, the CPU 10 reads image data in a predetermined amount from the memory card 12 and stores the same image data as the file cache 14*a* in the SDRAM 14. Next, the CPU 10 gives an instruction for executing the JPEG decode processing to the image processing circuit 20. As a result, the image processing circuit 20 reads the image data stored in the file cache 14*a*, and carries out the JPEG processing 50 to store the image data as the YCbCr 14*c* in the SDRAM 14. Subsequently, the processing shown in FIG. 5 is executed, and print data on a unit of a band are supplied to the printer engine 15 and are printed by means of the print head 16.

More specifically, the image processing circuit 20 constituted in hardware (for example, an ASIC (Application Specific Integrated Circuit)) reads and decodes, in predetermined order, compressed image data read from the memory card 12 as an external storage section by the CPU 10, which is the central processing circuit, and stored in the file cache 14*a* as the buffer provided in the SDRAM 14 which is the internal storage circuit. In the case in which the residual amount of the data in the file cache 14*a* is decreased, the image processing circuit 20 gives a notice to the CPU 10. The CPU 10 receiving the notice acquires at least a part of data from the compressed image data stored in the memory card 12 and stores the same data in the file cache 14*a* in predetermined order. By repeating such a processing, also in the case in which the capacity of the compressed image data is larger than that of the SDRAM 14, the image data can be decoded efficiently. Moreover, the image processing circuit 20 is constituted by hardware. As compared with the case in which the processing is carried out based on a program, therefore, it is possible to rapidly execute the decode processing. Furthermore, the CPU 10 executes an operation for reading the compressed image data from the memory card 12 to the SDRAM 14 and the image processing circuit 20 executes a processing of decoding the compressed image data read into the SDRAM 14. By assigning a part, therefore, it is possible to increase the speed of the processing.

While the compressed image data are read from the memory card 12 attached to the apparatus in the example of FIG. 1, it is also possible to connect an electronic apparatus having a memory card (for example, a digital camera) to the apparatus through a USB (Universal Serial Bus) connecting cable and reading the compressed image from the memory card provided in the electronic apparatus, thereby carrying out a processing, for example. In the case in which the electronic apparatus is connected, the CPU 10 previously gives access to the memory card provided in the electronic apparatus through the connecting cable and confirms that a compressed image file can be accessed, and then executes the decode processing. In the case in which both the electronic apparatus and the memory card 12 can be utilized, moreover, it is also possible to cause a user to previously select any of memory cards having the compressed image data stored which is set to be a processing target and to read the compressed image data from the memory card which is thus selected.

Step S3: The CPU 10 reads and analyzes an image file to be a printing object and executes a processing of generating the analytic table 14*k*. The details of the processing will be described below with reference to FIG. 6(B).

Step S4: The CPU 10 executes the processing for rotating and printing an image by referring to the analytic table 14*k* generated in the Step S3. The details of the processing will be described below with reference to FIG. 12.

According to the above processing, a normal processing is executed in the case in which an instruction for printing the image file is given and the image does not need to be rotated, and in the case in which the image is to be rotated, the analytic table 14*k* is generated and the rotation printing processing is executed so that a desirable image is printed.

Next, the details of the analytic table creation processing shown in the Step S3 of FIG. 6(A) will be described with reference to FIG. 6(B). When the flowchart is started, the following steps are executed.

Figure 7:
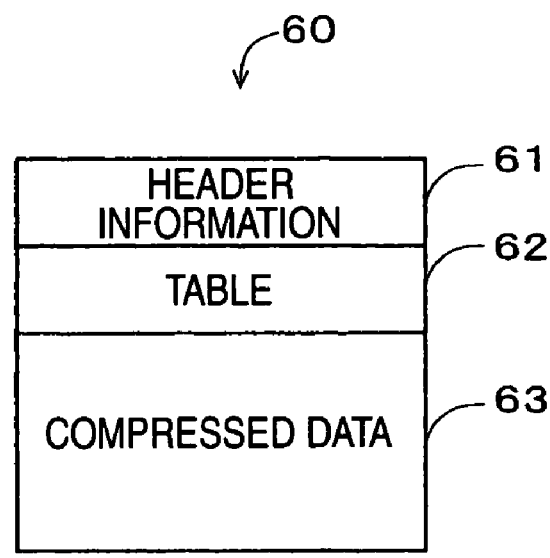
FIG. 7 is a diagram showing an example of a structure of an image file.

Step S10: The CPU 10 reads various decoding tables from an image file specified as a processing target. An image file 60 is constituted by header information 61, a table 62 and compressed data 63 as shown in FIG. 7. The header information 61 has information about a file name, a compressing method, an image size and a density unit, for example. The table 62 is constituted by a Huffman table and a quantizing table, for example. The compressed data 63 are constituted by image data compressed by the JPEG method. The image processing circuit 20 extracts various tables from the table 62 of the image file 60 shown in FIG. 7.

Figure 8:
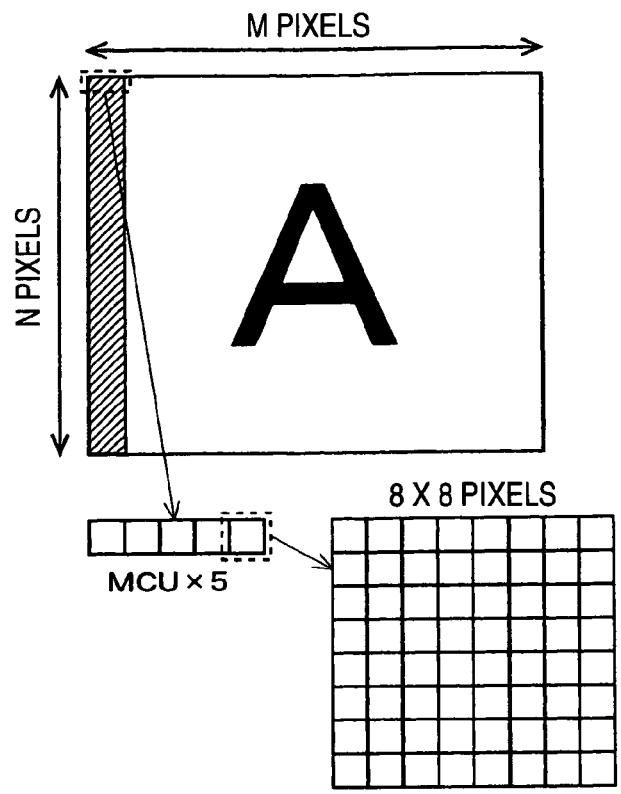
FIG. 8 is a diagram showing an example of a structure of an MCU.
Figure 8:
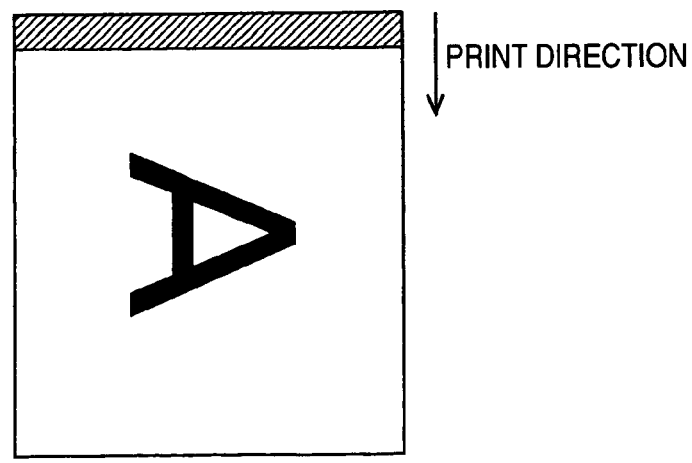

FIG. 8 shows an example of image data to be a processing target in the first embodiment according to the invention. As shown in FIG. 8(A), the image data have data constituted by N longitudinal pixels and M transverse pixels for each of Y, Cb and Cr. The image processing circuit 20 processes, as a one-time processing unit, a "processing block" constituted with an array of five MCUs constituted by 8×8 pixels in a transverse direction. As shown in FIG. 8(B), a processing block is set corresponding to a band width in which the print head 16 can carry out printing by one scan when image data are to be printed after a rotation in the printing apparatus.

Step S11: The image processing circuit 20 sets various decoding tables extracted at the Step S10 to the table 24 and the table 25c, respectively. More specifically, a Huffman table is stored in the table 24. Moreover, the Huffman table and a quantizing table are stored in the table 25c. Image information (information indicative of sizes in a length and a breadth) and MCU information (information indicative of a size of the MCU) are also read from header information 41 and are stored in the registers 23 and 25b, respectively.

Step S12: The image processing circuit 20 starts a processing of analyzing the image data. More specifically, the image processing circuit 20 gives a request for reading an image file 40 to the CPU 10, and furthermore, sequentially reads the image data read at the request and stored in the file cache 14a of the SDRAM 14 and carries out the Huffman decode processing by means of the Huffman processing unit 22a, thereby obtaining a DCT coefficient. By a comparison of the number of the DCT coefficients thus obtained with image information (information indicative of an image size), then, a position of the image data in which the processing block is present is analyzed. Thereafter, information (address information of an AC component and information about a value of a DC component) about a starting block positioned on a starting point (left end) of the image data (a processing block included in a region shown in hatching of FIG. 8(A)) is acquired.

Step S13: The control unit 22 of the image processing circuit 20 calculates an address and a bit which constitute the analytic table 14k based on a result of the analysis in the Step S12. FIG. 9 shows an example of the analytic table 14k. As shown in FIG. 9, the analytic table 14k has "No." indicative of the number of rows of a processing block (that is, a position in a direction of a row of an image), "Y", "Cb" and "Cr" indicative of respective DC components of Y, Cb and Cr, "Address" to be a relative address indicative of a position in which the AC component is stored in an image file, "Bit" indicative of a bit position actually including data from a position indicated by an address, "S Address" indicative of a physical address to be an absolute address of a head in the case in which the image data are stored in the buffer 14b provided in the SDRAM 14 (details of which will be described below with reference to FIG. 10), and "Residual Amount W" indicative of a residual amount of the buffer 14b. "Y", "Cb" and "Cr" are 2-byte data respectively, both "Address" and "Bit" are 4-byte data (Bit is 3-bit data), "S Address" is 4-byte data, and "Residual Amount W" is 2-byte data. Accordingly, a data volume obtained by adding all of them has 16 bytes. "No." is described for convenience of explanation and this portion is not included in the analytic table 14k.

At the Step S13, "Address" and "Bit" in the analytic table 14k shown in FIG. 9 are calculated. More specifically, there are calculated an address indicative of a relative position in a file of a processing block positioned on a starting point and a bit position actually including data from a position indicated by the address. Since a previous processing block is not present in the processing block at the starting point, all of Y, Cb and Cr are "0".

Figure 10:
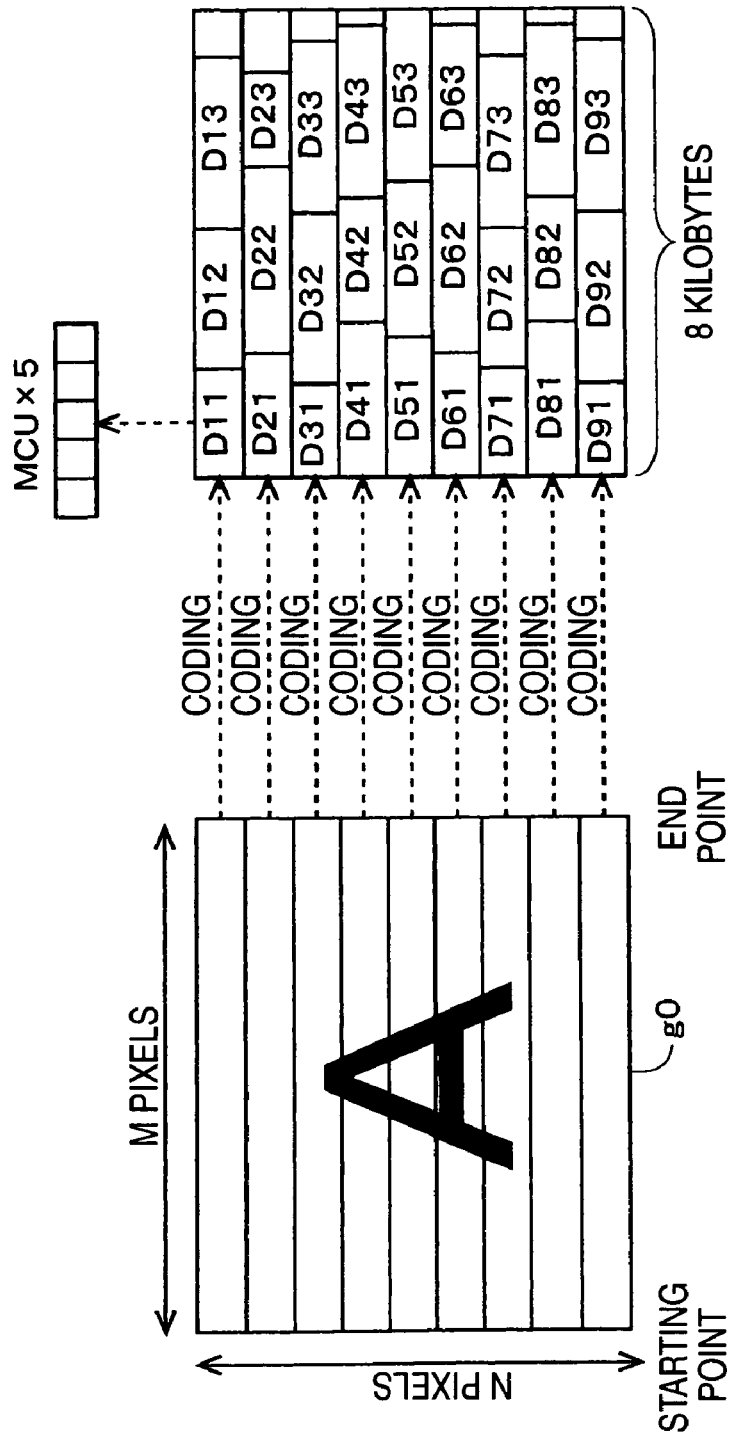
FIG. 10 is a diagram showing a relationship between image data and a processing block.
Figure 11:
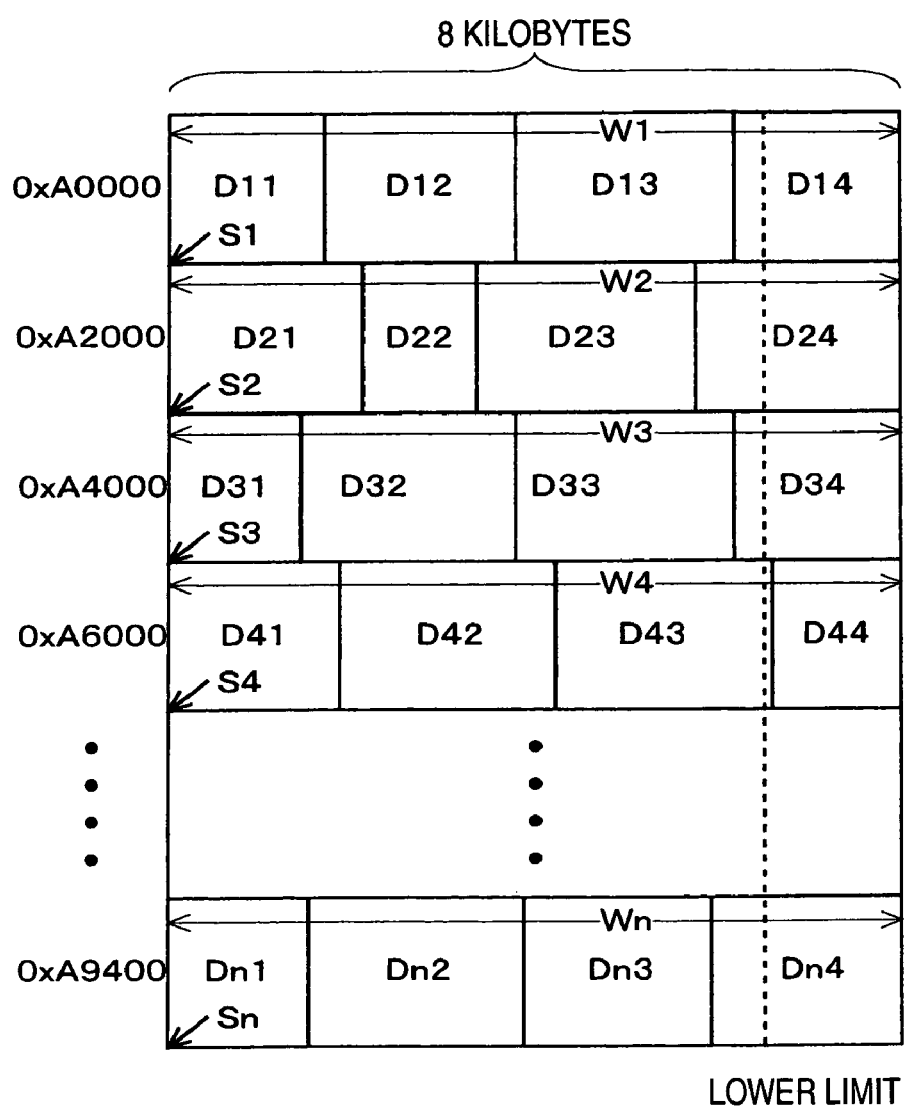
FIG. 11 is a diagram showing an example of a structure of a buffer according to the first embodiment.

Step S14: The CPU 10 calculates the S address indicative of the reading position of the image data and the residual amount W indicative of a capacity of unprocessed image data in the buffer 14b for storing the image data which is provided in the SDRAM 14. FIG. 10 is a diagram showing the summary of a relationship between the buffer 14b provided in the SDRAM 14 and the data to be stored in the buffer 14b. As shown in FIG. 10, when image data g0 which has not been subjected to coding are divided into MCUs having 8×8 pixels to be coded, a bit stream group is generated by coding the MCU groups present on a start point (left end) and an end point (right end) of the image g0. These bit streams are partially stored in the buffer 14b for each row. In FIG. 10, Dij indicates a processing block obtained by coding data constituted by collecting five MCUs, and i represents a row and j represents a column. FIG. 11 is a diagram showing a more specific example of the buffer 14b. As shown in FIG. 11, the buffer 14b is provided in a region in which an address 0xA0000 of the SDRAM 14 ("0x" indicates a hexadecimal number) is set to be a head, and the bit stream corresponding to each of the rows is stored every 8 bytes. Thus, the bit stream corresponding to each row is read on a unit of the processing block, and is supplied to the image processing circuit 20 and is thus processed. At this time, the S address indicates a head position of the bit stream supplied (read) into the image processing circuit 20. On the other hand, the residual amount W is a value obtained by subtracting the capacity of the processed image data from 8 kilobytes and represents a capacity of unprocessed image data.

Step S15: The control unit 22 of the image processing circuit 20 stores the analytic table 14k generated at the Step S13 and the Step S14 in a corresponding row of the SDRM 14. For example, in case of the buffer 14b shown in FIG. 11, a first row is stored at the address of "0xA0000". Therefore, the S address is "0xA0000" and the residual amount W is "0x2000" in an initial state. Moreover, all of Y, Cb and Cr are "0" because a previous processing block is not present. Furthermore, an address of "0x00000" is obtained because of the head of the file, and a bit of "0b000" ("0b" represents a binary number) is obtained. These data are collected and written as 16-byte data to a predetermined region of the analytic table 14k. Since a head address of the analytic table 14k is stored in the register 23, a writing position is determined by referring to the head address and an offset value defined by a target row.

Step S16: The CPU 10 decides whether the processing for all of the rows of the image data is completed or not. If the processing is ended, the processing proceeds to Step S 17. In the other cases, the processing returns to the Step S 12 and the same processing is repeated.

By repeating the above processing, the analytic table 14k shown in FIG. 9 is finished. In the example shown in FIG. 9, "0" is stored for all of Y, Cb and Cr, and information indicative of the position of the processing block present at the start point of the image data is stored in the address and the bit. Moreover, the head address of the buffer 14b shown in FIG. 11 is stored as the S address. Furthermore, "0x2000" corresponding to 8 kilobytes to be the size of the buffer 14b is stored as the residual amount.

Step S17: The CPU 10 refers to the address and the bit of the analytic table 14k shown in FIG. 9, thereby extracting image data corresponding to 8 kilobytes from each starting point (see FIG. 10) of the image file stored in the memory card 12 and storing the same image data in the buffer 14b shown in FIG. 11. As a result, as shown in FIG. 11, data in processing blocks D11 to D14 are stored in 8 kilobytes setting the address 0xA000 to be a head and data in processing blocks D21 to D24 are stored in 8 kilobytes setting the address 0xA200 to be a head, and data in processing blocks are stored in each address in the same manner.

By the above processing, the analytic table 14k is generated and is stored in the SDRAM 14 and the image data are stored in the buffer 14b.

Figure 12:
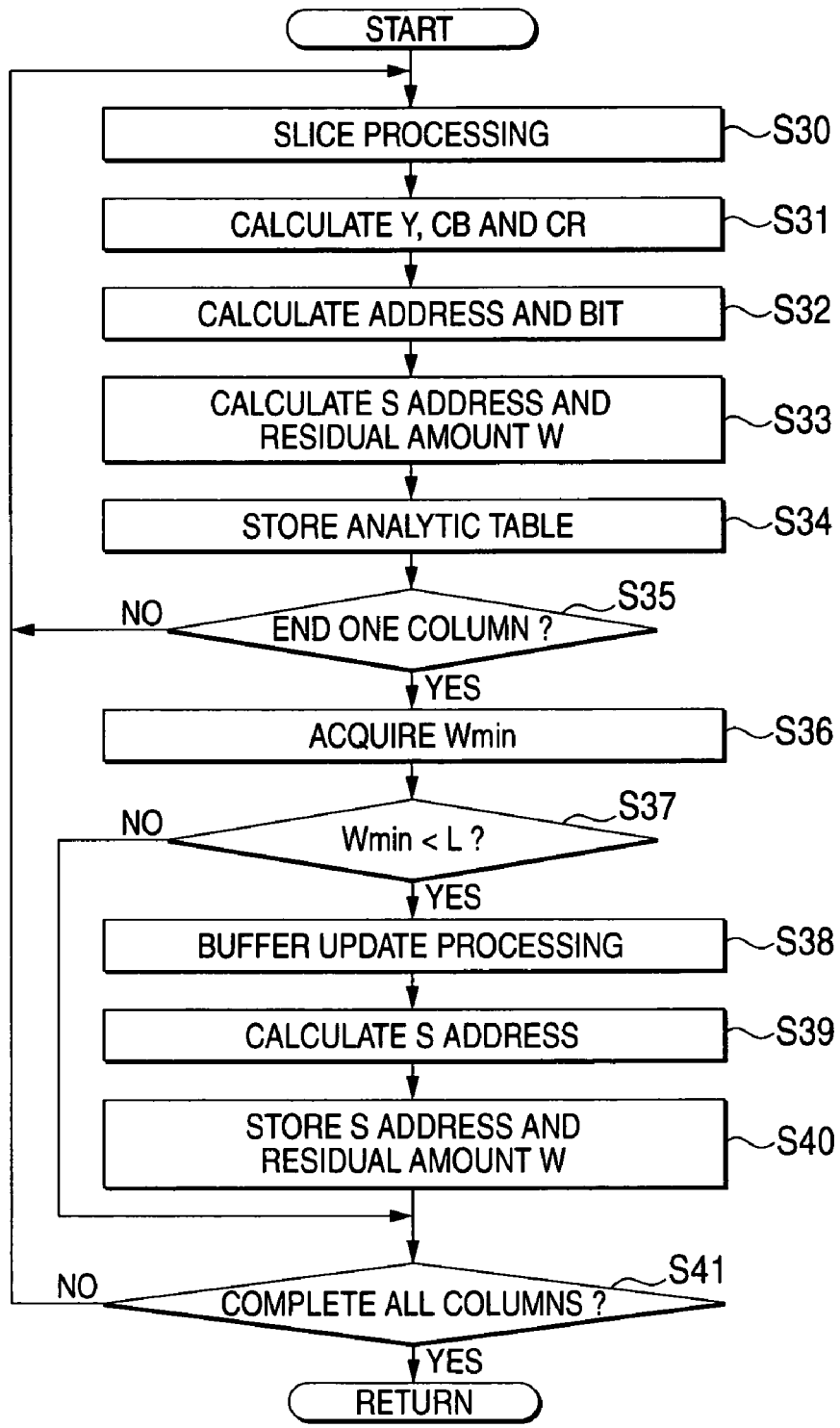
FIG. 12 is a flowchart showing the flow of the processing to be executed in the first embodiment.

Next, a description will be given of the rotating print processing shown in the Step S4 of FIG. 6(A). More specifically, a description will be given of a processing of decoding the image data by referring to the analytic table 14k generated as described above and rotating and outputting the same image data. FIG. 12 is a flowchart for explaining a processing to be executed when decoding image data. When the processing of the flowchart shown in FIG. 12 is executed, the following steps are carried out.

Step S30: The JPEG processing unit 25 of the image processing circuit 20 starts a processing of slicing image data when an instruction for starting the processing is given from the CPU 10. More specifically, the JPEG processing unit 25 of the image processing circuit 20 refers to the S address of the analytic table 14k, thereby extracting a processing block to be a processing target from image data stored in the buffer 14b of the SDRAM 14, and furthermore, extracting a predetermined bit by referring to "Bit" and sequentially supplying the same bit to the Huffman processing unit 25e, the reverse quantizing unit 25f and the IDCT unit 25g. For example, in the case in which the image g0 is rotated at 90 degrees in a clockwise direction as shown in FIG. 3, the image g1 is reproduced from right to left if a portion of the image g0 shown in hatching is decoded from top to bottom and is rearranged. In such a case, therefore, it is preferable to decode the data stored in the buffer 14b in a direction from a first element toward an nth element in the analytic table 14k shown in FIG. 9. As a result, the DC component of the head MCU of the processing block is calculated by referring to the values of Y, Cb and Cr in the analytic table 14k respectively and DC components are sequentially calculated by referring to the value of the DC component of a head of four succeeding MCUs. Moreover, AC components are calculated on a unit of the respective MCUs.

Step S31: The JPEG processing unit 25 of the image processing circuit 20 calculates Y, Cb and Cr to be the DC components by referring to the processing block to be a slice processing target in the Step S30. More specifically, the JPEG processing unit 25 calculates Y, Cb and Cr by referring to the DC component of the MCU positioned on the end of the processing block. Moreover, Y, Cb and Cr thus obtained are information for generating the CD component of the next processing block.

Step S32: The JPEG processing unit 25 of the image processing circuit 20 calculates an address and a bit for the analytic table 14k. More specifically, the JPEG processing unit 25 adds, to an address, a value corresponding to a data volume of the image data processed completely, and furthermore, regulates a value of the bit. As a result, the address and the bit indicate a position of the next processing block in an image file.

Step S33: The JPEG processing unit 25 of the image processing circuit 20 calculates the S address and the residual amount W. More specifically, in the same manner as in the case of the Step S32, a value corresponding to the data volume of the image data processed completely is added to the S address. Moreover, the value corresponding to the data volume of the image data processed completely is subtracted from the residual amount W.

Step S34: The JPEG processing unit 25 of the image processing circuit 20 updates (overwrites) a row corresponding to the analytic table 14k stored in the SDRAM 14 based on the information calculated at the Steps S31 to S33 through the SDRAM I/F 26. At this time, the information to be written to the analytic table 14k is updated as 16-byte data in a batch. More specifically, by setting to 16 bytes, it is possible to execute an access plural times, thereby preventing a long time from being required for the update processing.

Step S35: The image processing circuit 20 decides whether a processing for data corresponding to one column is ended or not. If the processing is not ended, the processing returns to the Step S30 and the same processing is repeated. In the other cases, the processing proceeds to Step S36. For example, in a first processing, it is decided whether the processing of the column c1 shown in FIG. 3(A) is completed or not.

Step S36: The CPU 10 refers to all of the residual amounts W to acquire a minimum residual amount Wmin. More specifically, the residual amount W corresponding to a row having the largest number of processed data in the buffer 14b is acquired.

Step S37: The CPU 10 decides whether Wmin is smaller than a predetermined lower limit value L (see FIG. 11). If Wmin is smaller than the predetermined lower limit value L, the processing proceeds to Step S38. In the other cases, the processing proceeds to Step S41. The lower limit value L serves to determine a lower limit capable of safely reading image data without causing a data change. For example, in the case in which the buffer 14b has a size of 8 kilobytes, the lower limit value L is set to be approximately 1 kilobyte to carry out reading therebeyond. Consequently, it is possible to prevent data other than the image data from being read by mistake. The lower limit value is properly set corresponding to a buffer size.

Step S38: The CPU 10 executes a processing of updating the buffer 14b. This processing is executed by an interruption from the image processing circuit 20 if it is decided to be Y at the Step S37. More specifically, the CPU 10 refers to the address and the bit of the analytic table 14k, and acquires a bit stream to be a next processing target by 8 kilobytes from each row and stores the bit stream in the buffer 14b shown in FIG. 11. The details of this processing will be described below.

Step S39: The CPU 10 obtains the S address. More specifically, a head address of the buffer 14b shown in FIG. 11 is acquired.

Step S40: The CPU 10 stores the S address obtained at the Step S39 and the residual amount W. More specifically, the head address shown in FIG. 11 and 0x2000 to be the residual amount W are stored.

Step S41: The image processing circuit 20 decides whether the processing for all column data is ended or not. If the processing is not ended, the processing returns to the Step S30 and the same processing is repeated. In the other cases, the processing is ended.

As described above, the rotation processing is carried out over the image data subjected to the decode processing, and the image data are then subjected to the color conversion processing 51 and are supplied to the print head 16 through the printer engine 58 so that an image is printed on a print paper by the processing in the rear stage shown in FIG. 5.

Figure 13:
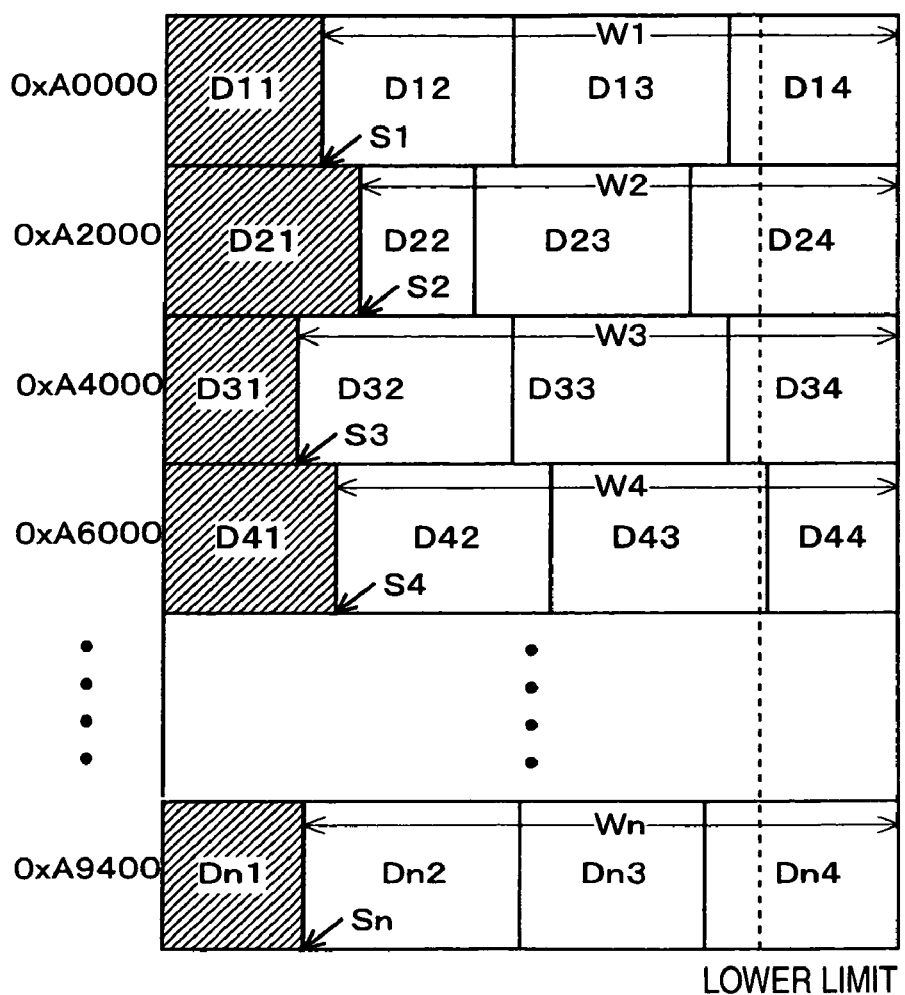
FIG. 13 is a diagram showing the case in which a processing for a first processing block is completed.

FIGS. 13 to 17 are diagrams showing a state in which data are read from the buffer 14b and the buffer 14b is then updated. FIG. 13 is a diagram illustrating a state in which processing blocks D11 to Dn1 on a head shown in hatching are read and processed by the image processing circuit 20. As a result, the S address of the analytic table 14k is set to be S1 to Sn which are the heads of processing blocks D12 to Dn2. Moreover, residual amounts W1 to Wn are values obtained by subtracting the capacities of the processing blocks D11 to Dn1 on the head from 0x2000 to be a length of each row in the buffer 14b.

FIG. 14 is a diagram showing an example of the analytic table 14k in the state in which the processing for a first column shown in FIG. 13 is completed. In this example, a DC value obtained by processing the processing block for the first column is stored as Y, Cb and Cr, respectively. Referring to the address and the bit, moreover, a value is changed corresponding to the size of the processing block processed completely. Referring to the S address and the residual amount W, furthermore, a value is changed corresponding to a size of the processing block processed completely in the same manner.

Figure 15:
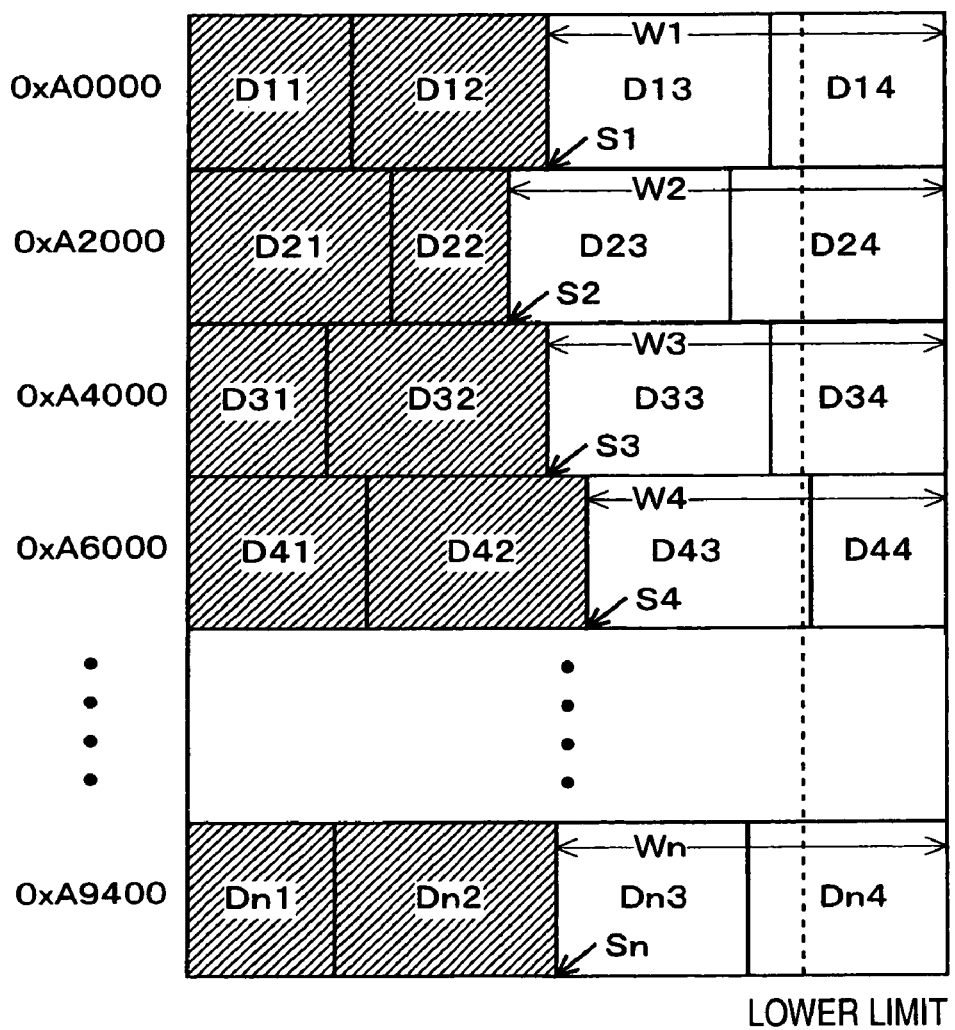
FIG. 15 is a diagram showing the case in which a processing for a second processing block is completed.

FIG. 15 is a diagram showing a state of the buffer 14b which is obtained after ending the processing of a second processing block. When the processing of the second processing block is completed, the S address is set to be S1 to Sn which is the head of a third processing block and the residual amounts W1 to Wn are values obtained by subtracting the capacities of the head processing blocks D11 to Dn1 and the second processing blocks D12 to Dn2 from 0x2000 to be a length of each row in the buffer 14b.

Figure 16:
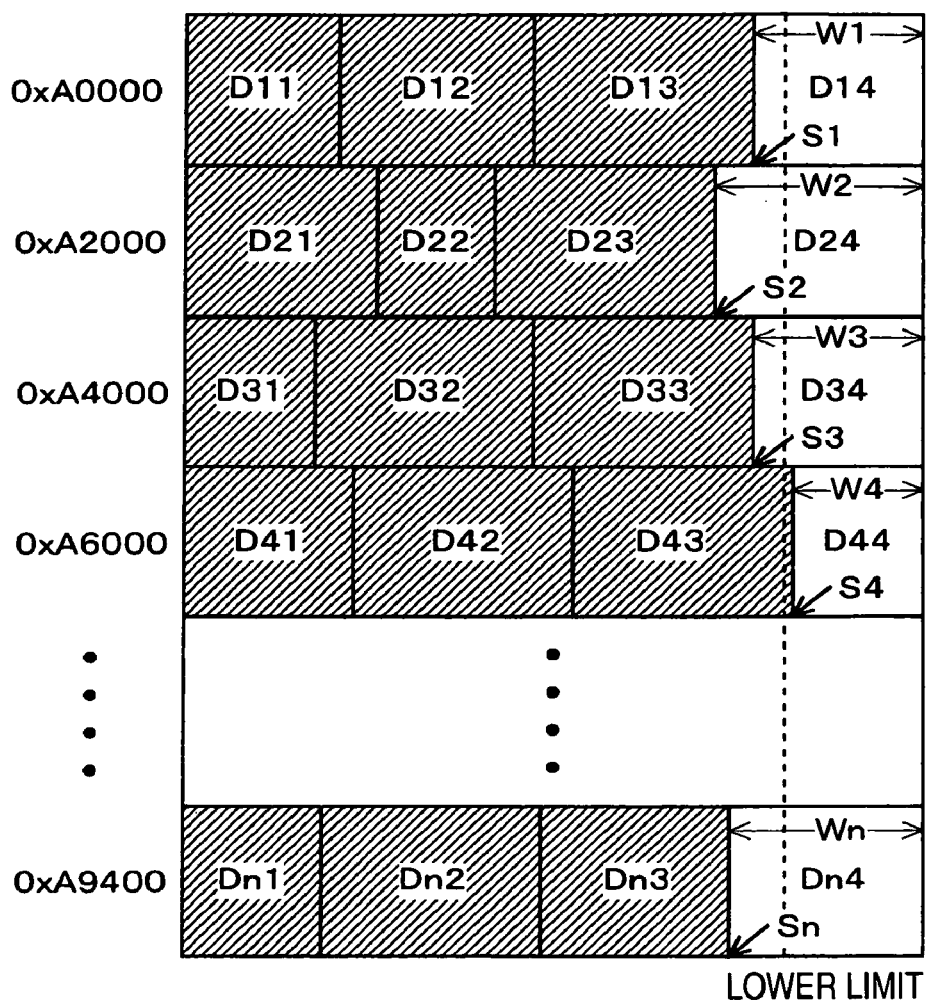
FIG. 16 is a diagram showing the case in which a processing for a third processing block is completed.
Figure 17:
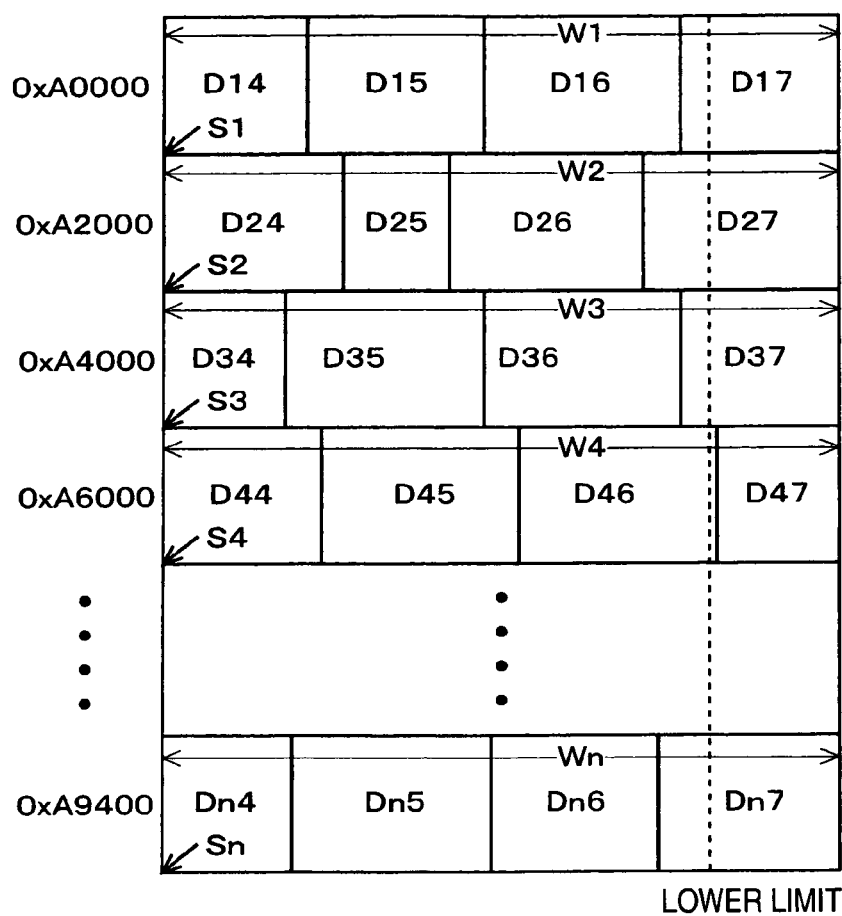
FIG. 17 is a diagram showing a state brought immediately after a buffer is updated.

FIG. 16 is a diagram showing a state of the buffer 14b which is obtained after ending the processing of a third processing block. When the processing of the third processing block is completed, the S address is set to be S1 to Sn which is the head of a fourth processing block and the residual amounts W1 to Wn are values obtained by subtracting the capacities of the head processing blocks D11 to Dn1, the second processing blocks D12 to Dn2 and third processing blocks D13 to Dn3 from 0x2000 to be a length of each row in the buffer 14b. At this time, the residual amount W4 is smaller than the lower limit value L (W4<L). Therefore, it is decided to be YES at the Step S37 in FIG. 12, and the processing proceeds to the Step S38 in which the update processing of the buffer 14b is executed. When the update processing of the buffer 14b is executed, fourth processing blocks D14 to Dn4 are disposed on the head of the buffer 14b and fifth and succeeding processes are disposed thereafter as shown in FIG. 17. Moreover, the S address is reconstituted to the head of the buffer 14b, and furthermore, the residual amounts W1 to Wn are reconstituted to 0x2000 to be the length of the buffer 14b, and the bit is not updated but a last value is retained. In the buffer 14b shown in FIG. 17, accordingly, the same processing as that in FIG. 11 is executed.

By repeating the above processing, it is possible to decode the image data.

As described above, according to the embodiment of the invention, the image processing circuit 20 executes the image slice processing while referring to the analytic table 14k and generates the analytic table 14k for next column data. Therefore, it is possible to quickly execute the processing of rotating an image.

In the embodiment according to the invention, moreover, the image processing circuit 20 automatically executes the slice processing and the analysis processing. Therefore, every time the processing of the processing block is completed, for example, it is possible to increase the speed of the processing more greatly by omitting an overhead related to the interruption processing as compared with the case in which the interruption is generated to cause the CPU 10 to be responsible for a subsequent processing. By relieving the burden of the CPU 10, moreover, it is possible to enhance a processing speed of the whole system. It is also possible to generate the interruption, thereby causing the CPU 10 to be responsible for the subsequent processing if necessary.

In the embodiment according to the invention, moreover, the buffer 14b shown in FIG. 11 is provided and the start position of the processing is represented by the S address, and furthermore, the update time of the buffer 14b is decided by the residual amount W. Therefore, it is possible to reliably know the processing start position and the update time. Moreover, it is possible to reduce a cost for the processing of calculating the S address and the residual amount W. More specifically, the S address is obtained by adding a value corresponding to a data volume processed completely in the image processing circuit 20. Moreover, the residual amount W is obtained by subtracting the value corresponding to the data volume processed completely in the image processing circuit 20 from 0x2000 to be the length of the buffer 14b. Accordingly, it is possible to easily calculate these values by the addition and the subtraction.

In the embodiment, moreover, Y, Cb and Cr in the analytic table 14k are set to be 2 bytes respectively, the address and the bit are set to be 4 bytes, the S address is set to be 4 bytes and the residual amount W is set to be 2 bytes to obtain 16 bytes (128 bits) in total as shown in FIG. 9. For this reason, the data volume is a multiple of 16 bits, 32 bits and 64 bits to be used often as a bus width. Therefore, it is possible to fully use a bus line, thereby reading the information stored in the analytic table 14k at a small number of times.

Second Embodiment

Next, a description of a second embodiment, according to the invention, will be given. A structure according to the second embodiment of the invention is almost the same as that in the first embodiment except that processes related to a table are different from each other in such a manner that a plurality of image data (two image data in FIG. 18) can be rotated and output at the same time as shown in FIG. 18. In the following, a processing related to the table will be mainly described.

Figure 19:
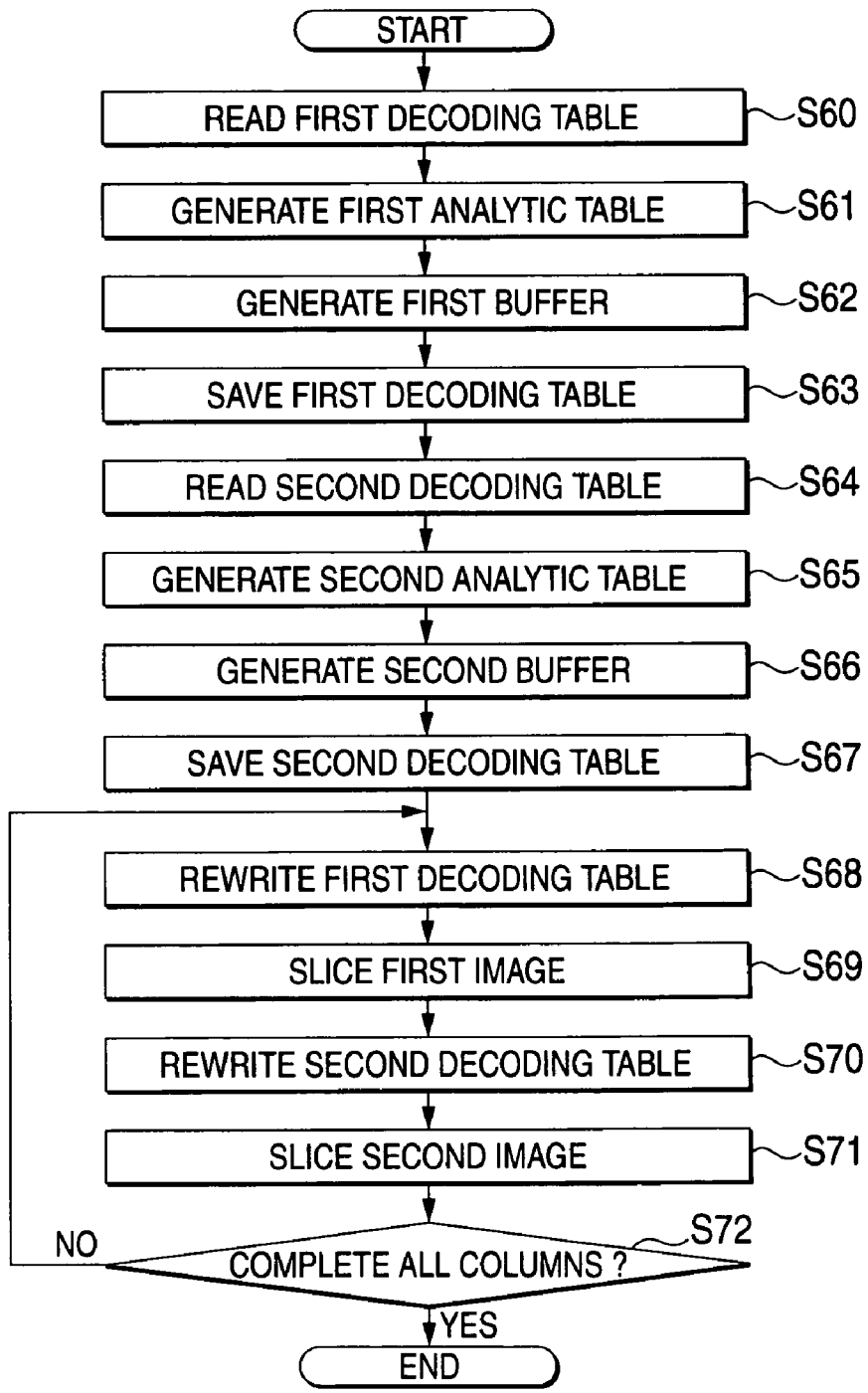
FIG. 19 is a flowchart showing an example of a processing to be executed in an image processing apparatus according to the second embodiment.

FIG. 19 is a flowchart for explaining a flow of the processing according to the second embodiment. When the processing shown in the flowchart is started, the following steps are executed.

Step S60: An image processing circuit 20 reads, from a memory card 12, table information about image data corresponding to a first image shown in FIG. 18, and sets the table information as a first decoding table to tables 24 and 25c.

Step S61: The image processing circuit 20 reads and analyzes the image data corresponding to the first image, thereby generating a first analytic table to be an analytic table for the first image.

Step S62: A CPU 10 generates a first buffer by referring to the first analytic table. For the first buffer, the same buffer as that in FIG. 11 is obtained.

Step S63: The image processing circuit 20 saves the first decoding table stored in the tables 24 and 25c in a predetermined region of an SDRAM 14.

Step S64: The image processing circuit 20 reads, from the memory card 12, table information of image data corresponding to a second image shown in FIG. 18 and sets the table information as a second decoding table to the tables 24 and 25c.

Step S65: The image processing circuit 20 reads and analyzes the image data corresponding to the second image, thereby generating a second analytic table to be an analytic table for the second image.

Step S66: The CPU 10 generates a second buffer by referring to the second analytic table. For the second buffer, the same buffer as that in FIG. 11 is obtained. The first buffer and the second buffer are stored in different regions of the SDRAM 14.

Step S67: The image processing circuit 20 saves the second decoding table stored in the tables 24 and 25c in a predetermined region of the SDRAM 14.

Step S68: The CPU 10 writes head addresses of the first decoding table and the first analytic table for the registers 23 and 25b and gives a request for executing a decode processing to the image processing circuit 20 in order to print the first image. As a result, the image processing circuit 20 rewrites the first decoding table saved in the SDRAM 14 to the tables 24 and 25c.

Step S69: The image processing circuit 20 executes a slice processing for a predetermined column of the first image data stored in the first buffer by referring to the first decoding table and the first analytic table. More specifically, the image processing circuit 20 executes the processing of the Steps S30 to S40 in the flowchart shown in FIG. 12, thereby executing the processing of decoding the image data stored in the first buffer while updating the first analytic table.

Step S70: The CPU 10 writes head addresses of the second decoding table and the second analytic table for the registers 23 and 25b and gives a request for executing a decode processing to the image processing circuit 20 in order to print the second image. As a result, the image processing circuit 20 rewrites the second decoding table saved in the SDRAM 14 to the tables 24 and 25c.

Step S71: The image processing circuit 20 executes a slice processing for a predetermined column of the second image data stored in the second buffer by referring to the second decoding table and the second analytic table. More specifically, the image processing circuit 20 executes the processing of the Steps S30 to S40 in the flowchart shown in FIG. 12, thereby executing the processing of decoding the image data stored in the second buffer while updating the second analytic table.

Step S72: The CPU 10 decides whether the processing for all of the column data is completed or not. If the processing is not completed, the processing returns to the Step S68 and the same processing is repeated. In the other cases, the processing is ended.

Figure 20:
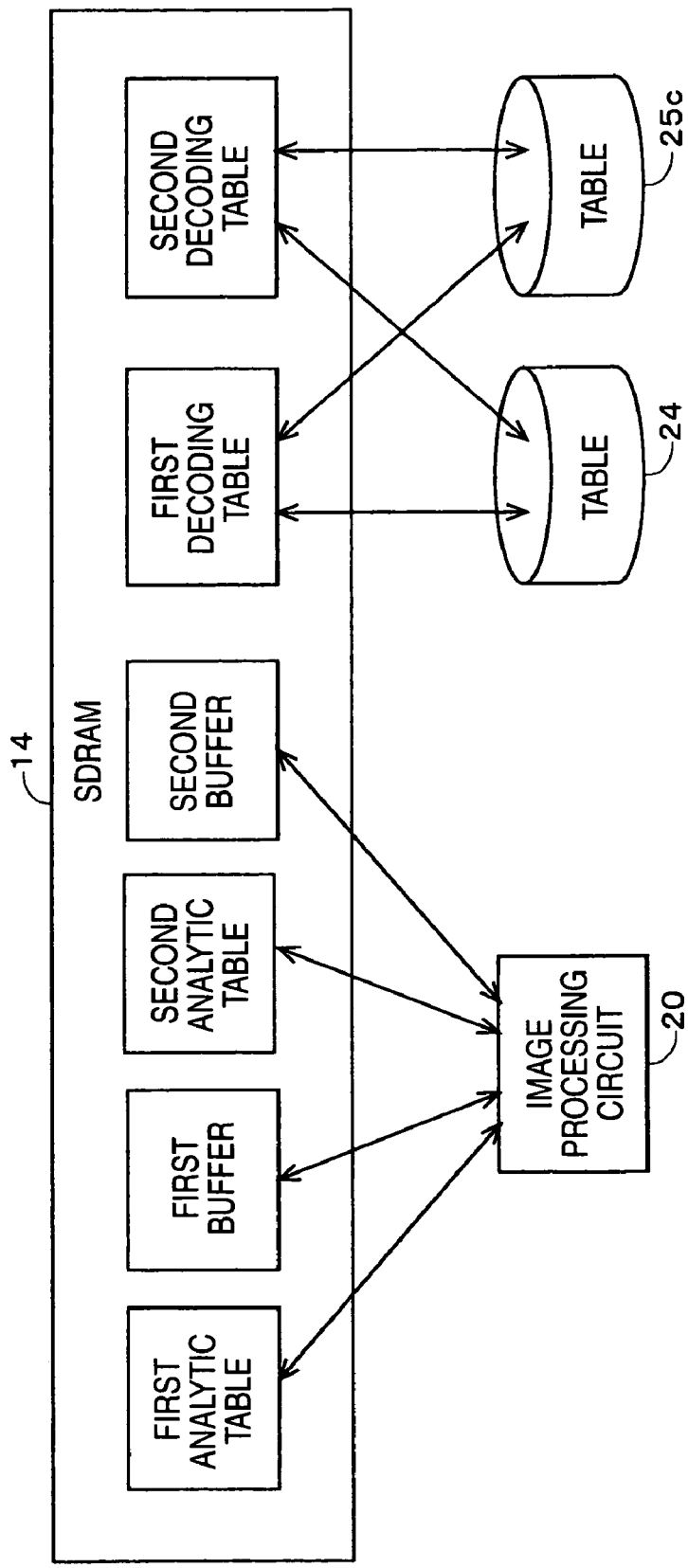
FIG. 20 is a diagram showing a selection state of a table according to the second embodiment.

FIG. 20 is a diagram showing the summary of the operation in the processing described above. As shown in FIG. 20, the image processing circuit 20 slices the image data from the first buffer by referring to the first analytic table when the first image is to be processed, and furthermore, slices the image data from the second buffer by referring to the second analytic table when the second image is to be processed. Furthermore, the tables 24 and 25c are subjected to the processing by rewriting the first decoding table when processing the first image, and rewriting the second decoding table when processing the second image. As a result, the first and second image data can be rotated as shown in FIG. 18.

As described above, in the second embodiment according to the invention, the analytic table, the buffer and the decoding table are switched on a unit of a column to carry out the decode processing. Consequently, it is possible to rotate a plurality of image data at the same time.

In the second embodiment according to the invention, moreover, the tables (the decoding table and the analytic table) to be used are designated through the CPU 10 to execute the decode processing. Therefore, it is possible to execute the processing without becoming conscious of the fact that the image processing circuit 20 processes a plurality of images.

While the decoding table is saved in the SDRAM 14 in the second embodiment described above, the capacities of the tables 24 and 25c may be increased for storage and a time required for the processing related to the saving may be shortened. According to the embodiment, a speed of the processing can be increased.

While the two images are processing targets in the second embodiment described above, moreover, it is also possible to process three images or more at the same time, for example.

Each of the embodiments is illustrative and other various modified embodiments are present. Although the description has been given by taking, as an example, the case in which the image data are rotated at 90 degrees in a clockwise direction in each of the embodiments, for example, it is apparent that the image data can also be rotated at 90 degrees in a counterclockwise direction or at 180 or 270 degrees in a clockwise direction or the counterclockwise direction. It is preferable to change the starting block and the order for slicing depending on the direction and angle of the rotation.

While the description has been given by taking, as an example, the processing block in which five MCUs are arranged in the longitudinal direction as shown in FIG. 8(A) in each of the embodiments, the invention is not restricted to such a case but the processing block may be constituted by one to four or six MCUs or more, for example.

While the image data stored in the memory card 12 are once read into the SDRAM 14 and are then analyzed by the Huffman processing unit 22a when the image data are to be analyzed (in the processing of the Step S12, for example) in the embodiments, it is also possible to directly read and analyze the image data from the memory card 12. The image data are once stored in the SDRAM 14 and are then analyzed in each of the embodiments according to the invention, which is based on the fact that a processing speed is enhanced by collectively reading the image data into the SDRAM 14 and processing them in a batch because of a low reading speed through the memory card 12 and the data read once can be reused by the utilization of the SDRAM 14 (the function of a cache can be expected).

Moreover, the circuit shown in FIGS. 1 and 2 is illustrative and it is apparent that the invention is not restricted to only such a case.

Furthermore, a portion excluding the memory card 12 in the circuit shown in FIGS. 1 and 2 can also be constituted as a single semiconductor device, and furthermore, can also be constituted as a plurality of semiconductor devices.

Although the CPU 10 executes the processing of the Steps S36 and S37 in FIG. 12, moreover, the image processing circuit 20 may executed them, for example. According to the embodiment, the CPU 10 does not need to relate to the processing before it is decided to be Y at the Step S37, and the burden of the CPU 10 can be relieved more greatly and the speed of the processing can be increased more highly as compared with the case of FIG. 12 in which the CPU 10 is concerned every time the processing of the MCU corresponding to one column is ended.

Moreover, the image processing apparatus according to each of the embodiments can be utilized in a printing apparatus such as an ink jet printer, for example. An applicable printing apparatus includes a so-called stand-alone printer capable of printing an image without connecting a host computer and a so-called copying machine having the function of a printer, a fax, a copy or a scanner, for example. By applying the invention to the printing apparatuses, it is possible to print an image at a high speed.

While the memory card 12 is directly connected to the memory card I/F 11 provided in the body in each of the embodiments, moreover, an electronic apparatus (for example, a digital camera) having the memory card 12 provided therein or connected thereto may be connected through a connecting cable (for example, a USB connecting cable), thereby reading the compressed image data from the memory card 12 provided in or connected to the electronic apparatus to execute the processing, for example. In that case, a countermeasure may be set to be taken against both the case in which the memory card 12 is connected through the memory card I/F 11 and the case in which the electronic apparatus is connected through the connecting cable, and an instruction for selecting either of the connecting configurations may be given through a user interface. More specifically, it is possible to display, on a display device, two types of icons, that is, an icon indicative of a state in which the digital camera is connected and an icon indicative of a state in which the memory card is inserted in a built-in slot and to select the connecting configuration depending on the selection of either of them.

In the case in which the electronic apparatus having the memory card provided therein or connected thereto is connected through the connecting cable, moreover, an operating unit on the apparatus side may be operated to select an image, thereby executing the processing or the operating unit on the electronic apparatus side may be operated to select an image, thereby executing the processing. More specifically, it is also possible to process an image based on the so-called pictobridge standards.

Moreover, the invention can also be applied to a digital apparatus such as a digital camera in addition to the printing apparatus. In the case in which the invention is applied to the digital camera, for example, it is possible to efficiently rotate image data in a small memory.

While the image processing circuit 20 executes only the processing of creating the analytic table 14$k$ when reading the compressed image data to create the analytic table 14$k$ in each of the embodiments, moreover, it is also possible to generate sampling data, histogram data and/or a correcting parameter which are required for the APF processing 52 shown in FIG. 5 together, for example. More specifically, in the APF processing 52, the image data obtained by the decode processing are first subjected to sampling at a predetermined rate to generate the sampling data and the sampling data are subjected to a statistical processing so that the histogram data (for example, information indicative of a distribution of a luminance for each color of RGB) are obtained. By referring to the histogram data thus obtained, information set by a user (information about a correction designated directly by the user) and EXIF (Exchangeable Image File Format) information (information indicative of a situation (an exposure) in photographing), the correcting parameter is generated. In the APF processing 52, the image data are subjected to a correction processing based on the correcting parameter to carry out the correction to have a desirable image. If the sampling data, the histogram data and/or the correcting parameter are created together when the analytic table 14$k$ is to be created, accordingly, it is not necessary to create them again in a print processing to be executed thereafter. Consequently, it is possible to enhance a processing speed. A data volume is decreased in order of the sampling data, the histogram data and the correcting parameter. In the case in which the capacity of the SDRAM 14 is small, therefore, a necessary storage capacity can be saved more greatly when latter data are selected. Moreover, a data throughput in a print processing can be saved more greatly when the latter data are selected. Consequently, a greater increase in the speed can be expected. In the case in which the information set by the user is changed, it is necessary to calculate the correcting parameter again. In addition to the correcting parameter, therefore, the sampling data or the histogram data may be stored together. In the case in which the setting is changed, the correcting parameter may be calculated from these data again.

In the case in which the processing is carried out by setting a plurality of images to be a target as in the second embodiment, it is preferable to create the sampling data simultaneously with the creation of the analytic table for the respective images and to store the sampling data corresponding to the respective images, and to carry out a correction processing by referring to the corresponding sampling data in the APF processing 52. Also in this case, it is possible to enhance a processing speed in the same manner as described above.

What is claimed is:

1. An image processing apparatus comprising:
   an internal memory, adapted to store a compressed image data of a compressed image therein;
   a processor, operable to acquire the compressed image data image data corresponding to at least a column of the compressed image from an external memory and to store the compressed image data in the internal memory; and
   an image processing circuit, having:
      a generating section, operable to analyze the compressed image data stored in the external memory and generate an analytic table indicative of a storage manner of the compressed image data;
      a decoding section, operable to read and decode the compressed image data stored in the internal memory by the processor, and rotate and output a decoding image data as a rotated image; and
   an updater, operable to update the analytic table in accordance with a decoding situation of the decoding section,
   wherein the processor is operable to store the image data in the internal memory with reference to the analytic table.

2. The image processing apparatus according to claim 1, wherein the analytic table includes address information indicative of an address including an MCU in a file containing the compressed image data and bit information indicative of a start position of the MCU in the address.

3. The image processing apparatus according to claim 1, wherein
   the internal memory is provided with a plurality of storage regions for storing the compressed image data in a unit of a column, and
   the decoding section decodes the compressed image data stored in the storage regions on a unit of the MCU.

4. The image processing apparatus according to claim 1, further comprising a printing section adapted to store a predetermined amount of the decoded image data decoded by the decoding section and then print the decoded image on a recording medium.

5. The image processing apparatus according to claim 1, further comprising a selecting section, operable to select either a first connecting manner in which the external memory is directly connected to an interface provided in the apparatus or a second connecting manner in which the external memory is connected to the apparatus through a connecting cable while connecting to an external apparatus.

6. The image processing apparatus according to claim 1, further comprising a confirming section, operable to confirm that, when the external memory is connected to the apparatus through a connecting cable while connecting to an external apparatus, the external memory can be accessed.

7. An image processing apparatus comprising:
an internal memory circuit, adapted to store at least a part of compressed image data stored in an external memory therein;
an image processing hardware circuit, operable to read and decode the compressed image data stored in the internal memory circuit and give a notice to a central processing circuit when a residual amount of the compressed image data in the internal memory circuit is reduced; and
the central processing circuit, operable to acquire the at least a part of the compressed image data from the external memory and store the compressed image data in the internal memory circuit when the notice is given from the image processing circuit.

8. An image processing apparatus comprising:
an internal storage circuit, adapted to store at least a part of compressed image data therein;
an image processing hardware circuit, operable to:
analyze the compressed image data and generate an analytic table indicative of a storage manner of the compressed image data;
read and decode the compressed image data stored in the internal storage circuit;
rotate and output the decoded image as a rotated image;
update the analytic table in accordance with a decoding situation; and
give a notice to a central processing circuit when a residual amount of the compressed image data stored in the internal storage circuit is reduced; and
the central processing circuit, operable to acquire the at least a part of the compressed image data from an external memory and store it in the internal storage circuit when the notice is given from the image processing hardware circuit.

9. The image processing apparatus according to claim 7, further comprising a selecting section, operable to select either a first connecting manner in which the external memory is directly connected to an interface provided in the apparatus or a second connecting manner in which the external memory is connected to the apparatus through a connecting cable while connecting to an external apparatus.

10. The image processing apparatus according to claim 7, further comprising a confirming section, operable to confirm that, when the external memory is connected
to the apparatus through a connecting cable while connecting to an external apparatus, the external memory can be accessed.

11. The image processing apparatus according to claim 7, wherein the image processing hardware circuit is a semiconductor.

12. The image processing apparatus according to claim 7, wherein the image processing hardware circuit is an integrated circuit.

13. The image processing apparatus according to claim 7, wherein the central processing circuit is executed based on a program.

14. An image processing method comprising:
analyzing compressed image data to cause an image processing circuit to generate an analytic table indicative of a storage manner of the compressed image data;
acquiring at least a part of the compressed image data from an external memory based on an instruction;
storing the at least a part of the compressed image data in an internal memory;
reading and decoding the compressed image data to rotate a decoding image;
detecting a residual amount of the compressed image data stored in the internal memory;
giving the instruction when the residual amount of the compressed image data stored in the internal memory is reduced; and
updating the analytic table in accordance with a decoding situation.

15. The image processing method according to claim 14, further comprising performing an auto photo fine processing.

16. The image processing method according to claim 15, wherein the auto photo fine processing includes at least one of a noise removal processing for removing a false color, a tone curve correction processing for regulating a white balance and a tone of a color, a memorized color correction processing for an adaptation to a color memorized by a person, a color saturation correction processing for regulating a brightness of an image, and sharpness processing for enhancing a contour.

17. The image processing method according to claim 14, further comprising: performing a sampling processing to the decoding image at a predetermined rate to generate sampling data;
performing a statistical processing to generate histogram data;
generating a correcting parameter based on at least the histogram data; and performing a correcting processing to correct the decoding image based on the correcting parameter.

18. The image processing method according to claim 17, wherein at least one of the sampling data, the histogram data and the correcting parameter is generated when generating the analytic table.

19. The image processing method according to claim 17, wherein the correcting parameter and at least one of the sampling data and the histogram data are stored for regenerating the correcting parameter.

20. The image processing method according to claim 17, further comprising performing a color conversion processing and a halftone processing.

* * * * *